United States Patent
Haleem et al.

(10) Patent No.: US 10,939,405 B1
(45) Date of Patent: Mar. 2, 2021

(54) SYSTEMS AND METHODS FOR IMPLEMENTING PERMISSIONLESS NETWORK CONSENSUS USING BLOCKCHAIN

(71) Applicant: Helium Systems, Inc., San Francisco, CA (US)

(72) Inventors: Amir Haleem, San Francisco, CA (US); Andrew Thompson, San Francisco, CA (US); Andrew Allen, San Francisco, CA (US); Marc Nijdam, San Francisco, CA (US); Jay Kickliter, San Francisco, CA (US)

(73) Assignee: HELIUM SYSTEMS, INC., San Francisco, CA (US)

( * ) Notice: Subject to any disclaimer, the term of this patent is extended or adjusted under 35 U.S.C. 154(b) by 0 days.

(21) Appl. No.: 16/837,295

(22) Filed: Apr. 1, 2020

Related U.S. Application Data

(60) Provisional application No. 62/830,727, filed on Apr. 8, 2019.

(51) Int. Cl.
*H04W 64/00* (2009.01)
*H04B 17/318* (2015.01)
*G16Y 10/75* (2020.01)
*H04L 29/06* (2006.01)

(52) U.S. Cl.
CPC .......... *H04W 64/00* (2013.01); *H04B 17/318* (2015.01); *G16Y 10/75* (2020.01); *H04L 63/0442* (2013.01)

(58) Field of Classification Search
CPC .............. G06F 16/1824; G06F 16/182; H04L 2209/38; H04L 63/126; H04L 9/0643; H04L 9/0861; H04L 9/12; H04L 9/3239; H04L 9/3247; H04L 9/3297; H04L 9/06; H04L 9/08; H04W 12/1002; H04W 4/023; H04W 64/003; H04W 88/16; H04W 12/10; H04W 64/00
See application file for complete search history.

(56) References Cited

U.S. PATENT DOCUMENTS

| 10,594,034 B1 * | 3/2020 | Tran ........................ G10L 25/51 |
| 10,742,837 B1 * | 8/2020 | Sankarapandian ......................... H04N 1/00896 |
| 2010/0002583 A1 | 1/2010 | Maxemchuk et al. |
| 2013/0036236 A1 | 2/2013 | Morales et al. |

(Continued)

OTHER PUBLICATIONS

X. Ling, J. Wang, T. Bouchoucha, B. C. Levy and Z. Ding, "Blockchain Radio Access Network (B-RAN): Towards Decentralized Secure Radio Access Paradigm," in IEEE Access, vol. 7, pp. 9714-9723, 2019, doi: 10.1109/Access.2018.2890557. (Year: 2019).*

(Continued)

*Primary Examiner* — Nathan S Taylor
(74) *Attorney, Agent, or Firm* — Wilson Sonsini Goodrich & Rosati

(57) ABSTRACT

Provided herein are systems and methods for implementing a network consensus for a blockchain network that is characterized by one or more, or all, of the following attributes: (1) implementation of a Proof-of-Coverage scheme; (2) lack of permission for nodes to participate in the network; (3) decentralization, with lack of incentives to centralize; (4) *byzantine* fault tolerance; (5) based on useful work to the network; (6) high confirmed transaction rate; and (7) censor-resistant transactions.

16 Claims, 13 Drawing Sheets

(56) References Cited

U.S. PATENT DOCUMENTS

| | | | |
|---|---|---|---|
| 2015/0312424 A1 | 10/2015 | Neethling et al. | |
| 2016/0217532 A1* | 7/2016 | Slavin | G06Q 30/0255 |
| 2017/0257906 A1 | 9/2017 | Gupta et al. | |
| 2017/0346833 A1 | 11/2017 | Zhang | |
| 2018/0048738 A1* | 2/2018 | Hinds | H04L 9/3236 |
| 2018/0060835 A1* | 3/2018 | Martin | G06Q 30/0267 |
| 2018/0109541 A1* | 4/2018 | Gleichauf | H04W 12/10 |
| 2018/0199172 A1 | 7/2018 | Boily et al. | |
| 2018/0211524 A1 | 7/2018 | Furuichi et al. | |
| 2018/0324157 A1* | 11/2018 | Piqueras Jover | H04L 63/0428 |
| 2018/0337769 A1* | 11/2018 | Gleichauf | G06Q 20/065 |
| 2018/0343052 A1 | 11/2018 | Lv et al. | |
| 2019/0036906 A1 | 1/2019 | Biyani et al. | |
| 2019/0124507 A1 | 4/2019 | Dotchkoff et al. | |
| 2019/0208422 A1* | 7/2019 | Haleem | G06F 16/1824 |
| 2019/0349426 A1* | 11/2019 | Smith | H04L 67/104 |
| 2019/0386832 A1* | 12/2019 | Palyutina | H04L 67/16 |
| 2020/0162263 A1* | 5/2020 | Iyer | H04L 9/3236 |
| 2020/0167512 A1* | 5/2020 | Chitra | G06Q 30/0185 |
| 2020/0323030 A1 | 10/2020 | Mehta et al. | |

OTHER PUBLICATIONS

V. Messié, G. Fromentoux, X. Marjou and N. L. Omnes, "BALAdIN for blockchain-based 5G networks," 2019 22nd Conference on Innovation in Clouds, Internet and Networks and Workshops (ICIN), Paris, France, 2019, pp. 201-205, doi: 10.1109/ICIN.2019.8685867. (Year: 2019).*

Imran Makhdoom, Mehran Abolhasan, Haider Abbas, Wei Ni; Blockchain's adoption in IoT: The challenges, and a way forward; Journal of Network and Computer Applications, vol. 125; 2019, pp. 251-279, ISSN 1084-8045; https://doi.org/10.1016/j.jnca.2018.10.019. (Year: 2019).*

Ana Reyna, Cristian Martin, Jaime Chen, Enrique Soler, Manuel Díaz; On blockchain and its integration with IoT. Challenges and opportunities; Future Generation Computer Systems, vol. 88; 2018, pp. 173-190; ISSN 0167-739X; ttps://doi.org/10.1016/j.future.2018.05.046. (Year: 2018).*

P. Kuo, A. Mourad and J. Ahn, "Potential Applicability of Distributed Ledger to Wireless Networking Technologies," in IEEE Wireless Communications, vol. 25, No. 4, pp. 4-6, Aug. 2018, doi: 10.1109/MWC.2018.8454517. (Year: 2018).*

H. Dai, Z. Zheng and Y. Zhang, "Blockchain for Internet of Things: A Survey," in IEEE Internet of Things Journal, vol. 6, No. 5, pp. 8076-8094, Oct. 2019, doi: 10.1109/JIOT.2019.2920987. (Year: 2019).*

Co-pending U.S. Appl. No. 16/586,261, filed Sep. 27, 2019.
Co-pending U.S. Appl. No. 62/613,364, filed Jan. 3, 2018.
Microchip ECC508A. Available at https://www.microchip.com/wwwproducts/en/ATECC508A, Dec. 6, 2019.
Roughtime. Available at https://roughtime.googlesource.com/roughtime/, Dec. 10, 2019.
Sompolinsky et al. Secure high-rate transaction processing in bitcoin. School of Engineering and Computer Science, The Hebrew University of Jerusalem, Israel; Microsoft Research 1-20, Jan. 2020.
U.S. Appl. No. 16/239,019 Office Action dated Jan. 26, 2021.

* cited by examiner

SYSTEMS AND METHODS FOR IMPLEMENTING PERMISSIONLESS NETWORK CONSENSUS USING BLOCKCHAIN

CROSS-REFERENCE

This application claims priority to U.S. Provisional Patent Application No. 62/830,727, filed Apr. 8, 2019, which is entirely incorporated herein by reference.

BACKGROUND

Despite the collective efforts of many well-funded companies, it is still difficult to develop and deploy connected sensing applications. Today nearly 75% percent of Internet of Things (IoT) projects fail due to the difficulty to connect embedded devices and sensors to the Internet. IoT applications, which are projected to generate over $11.1 trillion in economic value in under 10 years, need networks that are ubiquitous and/or decentralized in nature. Traditional networks, such as cellular networks, may not be well-suited for IoT applications because of issues in equipment cost, service cost, power efficiency, and/or battery life.

Many decentralized networks (e.g., blockchain network) operate by implementing a Proof-of-Work scheme, for example, under the Nakamoto Consensus. Under the Nakamoto Consensus, or Proof-of-Work scheme, a user must prove that a significant amount of computation efforts has been expended, and successfully completed, by the user in order to propose a new, valid block in the blockchain.

SUMMARY

However, a Proof-of-Work scheme has several limitations. First, this scheme can be extremely computationally expensive and power expensive. Such a process is not only severely dependent on but also rendered inefficient by hardware cost, power cost, physical space, and general computational efficiency. For example, the Bitcoin network, which uses the Proof-of-Work scheme, has been estimated to consume more power than many small countries. Power consumption for mining may increase even further, in an almost exponential manner, as the finite supply of the mined reward (e.g., Bitcoin) is depleted. In a second related issue, the Proof-of-Work scheme, and its computational challenges, encourages formation of mining pools, which defeats the many advantages of decentralization in the blockchain networks. In a mining pool, multiple users work together under a single pool address to combine computational efforts to, in parallel and/or in conjunction, mine a single block, and split the compensation between the pool members afterwards. Individual miners thus face a large barrier to compete for the blocks, as they are essentially forced to compete against a combined pool of resources with their oftentimes limited individual resources. Ultimately, a number of mining pools, instead of individual miners, may be left to monopolize the control of the consensus protocol, which centralizes the supposedly decentralized network.

Recognized herein are systems and methods for implementing a network consensus for a blockchain network that addresses at least the abovementioned problems.

In an aspect, provided is a method for achieving network consensus is a blockchain network comprising: (a) receiving proofs of network coverage from a plurality of users of said blockchain network; (b) based on said proofs of network coverage, electing a subset of said plurality of users as members of a consensus group; (c) receiving a plurality of transactions for network coverage from said plurality of users; and (d) achieving a consensus within said consensus group as to a subset of said plurality of transactions and storing said subset of said plurality of transactions in a new block in said blockchain network.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein) of which:

DETAILED DESCRIPTION

Figure 1A:
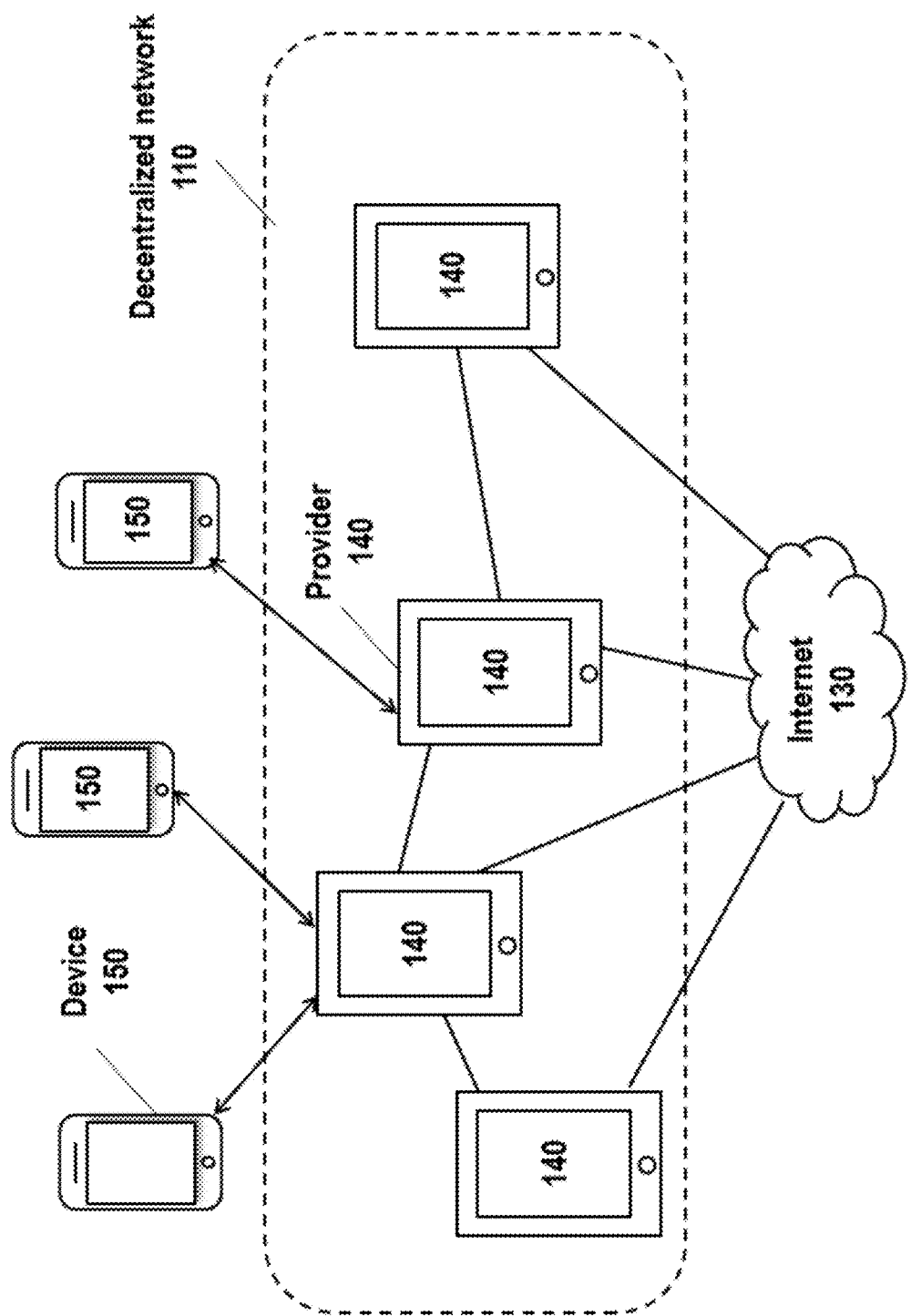
FIG. 1A shows an exemplary decentralized network, in accordance with various embodiments of the invention.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Provided herein are systems and methods for implementing a network consensus for a blockchain network that is characterized by one or more, or all, of the following attributes: (1) implementation of a Proof-of-Coverage scheme; (2) lack of permission for nodes to participate in the network; (3) decentralization, with lack of incentives to centralize; (4) byzantine fault tolerance; (5) based on useful work to the network; (6) high confirmed transaction rate; and (7) censor-resistant transactions.

The consensus may implement a Proof-of-Coverage scheme, as described elsewhere herein.

In a Proof-of-Coverage scheme, miners are required to submit proof of wireless network coverage, for example, instead of proof of completion of computations. A miner may provide wireless network coverage using gateway hardware which can provide a machine (e.g., capable of communicating with the gateway hardware, such as via radio transmission) access to a network (e.g., the Internet) in a transaction. Miners may create new blocks by being elected to an asynchronous Byzantine Fault Tolerant consensus group, wherein a given miner's probability of being elected is based on the quality of the wireless network coverage they provide. In this scheme, miners may benefit by being rewarded for creating new blocks, and also by being rewarded for completing each transaction with a machine. Machines may benefit by being provided network access (e.g., Internet access) from the miners. For example, such Proof-of-Coverage scheme may be implemented instead of the typical Proof-of-Work scheme.

The consensus may allow for permissionless participation, wherein any given node, if adhering to the consensus rules, may freely participate in the network without permission or approval from any other node, or entity.

The consensus may be decentralized, and also lacking incentives to centralize. In contrast, a typical other consensus operating under a Proof-of-Work scheme, although intended to implement a decentralized network, may inherently incentivize centralization (or semi-centralization) among its users, for example for economic reasons. For example, under a Proof-of-Work scheme, a miner must complete resource-heavy computations in order to propose a new block. Because the computations are so resource-heavy, the ability to mine a block is severely dependent on, but also rendered inefficient by, hardware cost, power cost, physical space, and general computational efficiency. Such computational challenges encourage mining pools, where multiple users work together under a single pool address to combine computational efforts to, in parallel and/or in conjunction, mine a single block, and split the compensation between the pool members afterwards. Individual miners thus face a large barrier to compete for the blocks, as they are essentially forced to compete against a combined pool of resources with their oftentimes limited individual resources. Ultimately, a number of mining pools, instead of individual miners, may be left to monopolize the control of the consensus protocol, which centralizes the network. The consensus described herein may factor out such incentives such that, for example, cheaper access to electricity in certain geographies, and/or the purchase of more hardware in the same location, is ineffective or cost prohibitive. Alternatively or in addition, the consensus may prohibit the formation of mining pools or other collaborative mining groups, such as under the consensus rules, or by inherent nature of implementing the Proof-of-Coverage scheme.

The consensus may be tolerant to Byzantine failures such that agreement can be achieved as long as a predetermined threshold number of actors are acting honestly.

The consensus may be based on useful work. That is, achieving network consensus is in itself useful and reusable to the entire network. This is in contrast to, for example, the Nakamoto Consensus-based systems, where the work completed is only useful for the particular block being mined and not otherwise useful to the network.

The consensus may have a high confirmed transaction rate. A transaction may be labeled, or otherwise considered, confirmed when the transaction is seen in a block. The consensus may have a relatively short settlement time (e.g., the duration it takes for the network to achieve consensus) to achieve the high confirmed transaction rate.

The consensus may be censor-resistant, such that miners are not able to censor or otherwise pick and choose transactions prior to mining them.

Decentralized Network for Propagating Wireless Network Coverage

In a systemic overview, to be described in further detail below, a decentralized network (e.g., low power wide area wireless radio frequency network) of network coverage providers may operate purpose-built hardware, herein referred to as "gateways," which are compatible with a wireless protocol. The providers may provide network coverage, to a wide area network (WAN) such as the Internet, to one or more end node devices which are also compatible with the wireless protocol. The providers may receive tokens for providing network coverage service to the end node devices and the end node devices may spend tokens for receiving the same services. The decentralized network may be facilitated without a central entity coordinating or directing the network coverage (e.g., data transmission), in a blockchain ledger. An end node device may store its private key in commodity key-storage hardware and public key in the blockchain. A provider may be a miner in the blockchain. A user may join the network as a miner, such as by purchasing or building a gateway device that conforms with the wireless protocol, asserting the user's satellite-derived location, and staking a token deposit (e.g., which may be proportional to the density of other miners operating in the same given geographic area). A miner may mine a new block by being elected to an asynchronous consensus group, which is described in further detail below. A miner may be elected to such consensus group based on the miner's quality of service (e.g., wireless network coverage). The blockchain may employ a Proof-of-Coverage scheme to verify (and even guarantee) that the miners are honestly representing the wireless network coverage they are providing. In some instances, the proof of coverage may require the providers to prove coverage periodically, upon demand, and/or at random intervals.

Data transmission between nodes of the network may be managed and enabled using Blockchain technology with a native token. In some embodiments, the native token may relate to the data transmission service provided by one or more nodes of the decentralized network. The decentralized network may be a blockchain consensus network comprising a plurality of nodes each of which may be cryptographically verified in one or more parameters (e.g., network coverage, physical location, time, etc.). In some cases, the decentralized network may be, in particular, designed for low power devices.

FIG. 1A shows an exemplary decentralized network 110, in accordance with various embodiments of the invention. The decentralized network 110 may comprise one or more providers 140 configured to provide connection between one or more devices 150 and a wide area network (e.g., Internet 130), thereby providing network coverage to the one or more devices 150. In some cases, network coverage provided by the providers may be managed and verified using blockchain technology, a proof-of-coverage, and/or proof-of-serialization scheme.

In some cases, the decentralized network 110 may be a wireless network. In some cases, the decentralized network may comprise a plurality of nodes. The plurality of nodes may be independent nodes that are interconnected to form the decentralized network 110 without a central coordinator. In some cases, at least a portion of the nodes may each be capable of accessing a wide area network (WAN). The nodes may comprise hardware, software, or a combination of both that is capable of accessing the wide area network (e.g., Internet). For instance, a node may comprise or be coupled to a gateway device such as a modem, hub, bridge, switch, router, server, workstation, desktop computer, laptop computer, tablet, mobile phone, desk phone, wearable device, or other network or electronic device. The gateway device may be physical, virtual, or a combination of both. A node may comprise or be coupled to software or application for communicating with and directing network traffic. A node may be substantially static or mobile. Details about the gateway device and the application are described later herein.

The wireless network 110 may be a wide-area wireless radio frequency (RF) network, which can be combined with a blockchain and/or a token. The blockchain may run on one or more proofs, where blocks can be created by miners (e.g., from providers 140) who can provide (and/or prove) physical RF network coverage in a cryptographically verified physical location and/or time. In some embodiments, the wireless network may be a Decentralized Low Power Wide Area Network (DLPWAN) implementation. In some instances, the systems and methods may provide a bi-directional data transfer between wireless RF devices and the Internet 130 via a network of independent providers 140 that may not rely on a single coordinator. Alternatively or additionally, the data transmission may be one way such as a downlink or an uplink.

In some cases, at least one of the one or more devices 150 may seek for access to a network (e.g., Internet 130) or network coverage. The one or more devices 150 may not be capable of connecting to the network directly. Each device of the one or more devices 150 may pay (e.g., tokens) for the data transmission such as sending data or receiving data. A device may pay for various other services or information provided by the providers 140. A device in the DLPWAN may use end node hardware to send and receive data via the distributed and decentralized network 110 of providers 140 (e.g., via the network of gateway devices operated by the providers). In some cases, a device may specify the price it is willing to pay for data transmission, such as Internet coverage, message delivery, or other information such as geolocation.

The one or more devices 150 may include any device capable of communicating with at least one of the providers 140 (e.g., via gateways) on the network 110. In some cases, the one or more devices 150 may be low power devices. For example, a device may be a device with low data rate, such as sensors, actuators, Bluetooth devices, infrared devices, WiFi devices, optical devices, meters, on-street lighting control, precision agriculture controller, and the like. Alternatively, the one or more devices 150 may include devices that are not low power devices. In some cases, the one or more devices can be battery-powered sensors. In some cases, the one or more devices can include devices that can live for several years using standard batteries. Alternatively or in addition, the one or more devices can include devices that are mains-powered. In some cases, the one or more devices 150 may be non-TCP/IP devices. For example, the decentralized network 110 may serve to bring internet connectivity to sensors, actuators, and other such devices without these compromises. In some embodiments, the decentralized network may be used to connect any subnet or local network to a wide area network there by providing a wide range of communication with improved flexibility and lower cost.

The one or more devices 150 can exist in a variety of forms, depending on the product or use case, and a variety of transmission and reception strategies can be employed to optimize for transmission/reception frequency or battery life.

In some instances, the one or more devices 150 can be manufactured using commodity hardware available from a wide variety of vendors, and/or for a low cost Bill Of Materials (BOM). The technology in modern radio transceiver integrated circuits (ICs), such as the Texas Instruments CC1125 or STMicroelectronics S2-LP, combined with modern Forward Error Correction (FEC) techniques, can enable long-range network systems that can be built without the need for proprietary modulation schemes or physical layers. In some cases, a device may use the Microchip ECC508A (www.microchip.com/wwwproducts/en/ATECC508A) or equivalent hardware-based key storage device, which is able to securely generate, store, and authenticate public/private NIST P-256 ECC key pairs without leaking the private key to anyone. In addition, a wide array of defense mechanisms can prevent logical attacks on the encrypted data between the key storage device and its host device, along with physical protections on the security device itself. The device can program their key storage device as part of the onboarding process defined in the wireless specification.

The independent nodes of the decentralized network 110 may be or be operated by providers 140. The providers may provide network access to one or more devices (e.g., low power devices) that may not be capable of accessing the network directly. In some cases, the providers may provide data transmission services such as network coverage to the low power devices. In some embodiments of the invention, the network coverage or data transmission service may be proofed using a blockchain, proof-of-coverage, and/or proof of serialization schemes. Details about the blockchain, proof-of-coverage, and proof-of-serialization schemes are described later herein.

Providers 140 may earn tokens by providing network coverage. The providers may operate gateway devices on the network 110 that can create wireless network coverage and/or mine blocks for the blockchain. The providers may specify the token price they are willing to accept for data transmission, such as Internet coverage, message delivery, or other information such as geolocation. The data transmission or communication links provided by the providers 140 may or may not have the same characteristics across the providers. In some cases, different communication links may have different characteristics such as noise, interference, signal-to-noise ratio, bit error rate, fading rate, or bandwidth.

In some cases, these characteristics may influence the price negotiated between a provider and a device.

Providers 140 may provide wireless network coverage, such as long range RF wireless coverage (e.g., DLPWAN), via the gateway devices. In some cases, providers 140 may provide narrowband wireless network coverage. In some cases, providers 140 may provide 900 megahertz (MHz) wireless network coverage, a 2.4 gigahertz (GHz) wireless network coverage, or a 60 GHz wireless network coverage. The bandwidth of the data transmission links between the gateway and a participating device (from the one or more devices 150) may be in a range from about 10 kilobits per second (kbps) to about 1 megabits per second (Mbps), or any range below 10 kbps, or any range above 1 Mbps. The gateway devices of the providers 140 may allow long range communications. A single gateway device may each support many of the one or more devices 150 (e.g., end nodes) on the network. In some cases, the gateway devices may have an operating range of at least one kilometer (km). In some cases, the gateway devices may employ any suitable coding or modulation scheme such as binary shift keying (BSK), direct sequence spread spectrum (DSSS), frequency hopping spread spectrum, or Gauss frequency-shift keying (GFSK), Quadrature Amplitude Modulation (QAM) or quadrature phase shift keying (QPSK), power amplification, forward error correction (FEC) and, various other data transmission methods. In some cases, the gateway devices may switch power amplification, bandwidth, and/or bitrate in real-time to optimize for signal quality, transmission rate, and/or battery life.

A provider may operate a gateway to provide network coverage to the one or more devices. Gateways can be physical network devices. For example, gateways can create wireless RF coverage over wide areas, and/or act as mining nodes for the blockchain. The gateways can transmit data back and forth between routers (described in further detail elsewhere herein) on the Internet 130 and one or more devices 150 on the network, process blockchain contracts and micro-transactions, and/or provide validation and verification systems for the blockchain mining process.

The gateways may be configured to permit direct communications, indirect communications, or both. The gateways may be capable of switching between different communication types. For example, the wireless connection may be a direct wireless connection, such as Bluetooth® (e.g., a wireless technology standard for exchanging data over short distances using short-wavelength UHF radio waves in the ISM band from 2.4 to 2.485 GHz), infrared, ZigBee™, near field communication (NFC), ultraband, WiFi (e.g., a technology for wireless local area networking with devices based on the IEEE 802.11 standards), optical communications, and the like. The wireless connection may be a short-range wireless communications (e.g., on the order of reaching at least a few centimeters, tens of centimeters, meters, or tens of meters). The wireless connection may be an indirect wireless connection, such as 3G, 4G, LTE, GSM, or WiMax. The wireless connection may traverse a telecommunications network. The wireless communication may permit long-range wireless communications and/or may not be dependent on relative locations between the user device and the card reader. The wireless communication may traverse one or more intermediary devices or relay stations.

In some cases, the gateways can create long distance coverage, for example, at least about 50 meters, 75 meters, 100 meters, 125 meters, 150 meters, 175 meters, 200 meters, 225 meters, 250 meters, 275 meters, 300 meters, 350 meters, 400 meters, 450 meters, 500 meters, 350 meters, 600 meters, 450 meters, 700 meters, 750 meters, 800 meters, 850 meters, 900 meters, 950 meters, 1 kilometers, 2 kilometers, 3 kilometers, 4 kilometers, 5 kilometers, 6 kilometers, 7 kilometers, 8 kilometers, 9 kilometers, or 10 kilometers. Gateways can be a cost effective way to create wide area network coverage for compatible devices.

Gateways may connect to the Internet 130 using any TCP/IP capable backhaul, such as Ethernet, WiFi or cellular. The gateways may contain a radio frontend capable of listening to several MHz of RF wireless spectrum at a time, and/or configured to hear all network traffic transmitted within that spectrum. In some cases, the gateways may use synchronized frequency hopping schemes.

The gateways may be located at or a component of any other device or system. Such device or system may or may not be movable. In some cases, the gateway may be a component of a portable device or a movable object such that a geo-location of the gateway may be dynamic. The gateways can require a GPS or GNSS transceiver to obtain accurate position and/or date/time information. This satellite-derived location can be used in conjunction with a variety of other techniques to verify that a gateway is in fact providing wireless network coverage in the location it claims, and/or to mine tokens for that service.

Satellite location information can also be correlated with packet arrival events to provide Time Differential of Arrival (TDoA) location for one or more devices 150 if multiple gateways observe the same packet. This can allow the one or more devices 150 to physically locate themselves without requiring a GPS/GNSS transceiver. It can also provide accurate location data at a fraction of the battery life and cost of competing methods.

A provider 140 may be a miner. Miners may earn tokens from transactions that take place across the network. Miners may earn tokens by validating the integrity of the network. For example, miners may participate in the creation of new blocks for the underlying blockchain by verifying that other providers 140 on the network are acting honestly. In some cases, the providers may be verified using a scheme (e.g., Proof-of-Coverage, Proof-of-Serialization) to prove one or more properties of the provider, such as the compatibility of hardware and firmware of the provider's gateway with the wireless protocol in the network 110 and physical location or time of the provider. The provided system and/or method may not require a miner to mine blocks by computing complicated hashes, thereby improving the efficiency of a mining process. In some instances, a user may join the network as miners by purchasing or building a gateway that conforms to the wireless protocol. The user may stake a token deposit proportional to the density of other miners operating in a given area.

In preferred embodiments of the invention, the token may be a native token that does not rely on other assets or currency forms. For example, the token may correspond to the network coverage provided by other providers of the network. In some cases, a value of a token or an amount of a token may correspond to a certain amount of time of network coverage provided by a provider at certain transmission rate or regardless of transmission rate. Alternatively or in addition, a value of a token or an amount of a token may correspond to the total amount of data being transmitted, such as sending or receiving data between a device (e.g., from the one or more devices 150) and Internet.

The token can be used by the one or more devices 150 to pay providers 140, in order to transmit and receive data, or provide other services, such as to geolocate themselves. The amount of token required for transmitting and receiving data, and/or geolocating themselves, can be negotiated via an automated bidding process.

The token may be traded on exchanges and/or stored with various wallets. For example, the token can be exchanged for other currencies such as Bitcoin (BTC), Ethereum (ETH), and the United States dollar (USD). In some cases, the token may expire or have a limited life. The half-life of the token block rewards can be set from about 1 to about 20 years, for example, from about 1 to about 2 years, from about 1 to about 3 years, from about 1 to about 4 years, from about 1 to about 5 years, from about 1 to about 10 years, from about 1 to about 15 years, from about 1 to about 20 years, from about 2 to about 3 years, from about 2 to about 4 years, from about 2 to about 5 years, from about 2 to about 10 years, from about 2 to about 15 years, from about 2 to about 20 years, from about 3 to about 4 years, from about 3 to about 5 years, from about 3 to about 10 years, from about 3 to about 15 years, from about 3 to about 20 years, from about 4 to about 5 years, from about 4 to about 10 years, from about 4 to about 15 years, from about 4 to about 20 years, from about 5 to about 10 years, from about 5 to about 15 years, from about 5 to about 20 years, from about 10 to about 15 years, from about 10 to about 20 years, or from about 15 to about 20 years. For instance, the half-life of the token block rewards can be set at 6 years.

Blockchains and Physical Implementations of the Decentralized Network

The decentralized network disclosed herein may be achieved with a blockchain. A blockchain is a secure and distributed ledger of transactions. A blockchain is a data structure that stores a list of transactions, forming a distributed electronic ledger that records transactions between source identifiers and destination identifiers. The transactions are bundled into blocks and every block (except for the first block) refers back to or is linked to a prior block in the chain. Computer nodes maintain the blockchain and validate each new block and the transactions contained therein. The integrity (e.g., confidence that a previously recorded transaction has not been modified) of the entire blockchain is maintained because each block refers to or includes a cryptographic hash value of the prior block. Accordingly, once a block refers to a prior block, it becomes difficult to modify or tamper with the data (e.g., the transactions) contained therein. This is because even a small modification to the data will affect the hash value of the entire block. Each additional block increases the difficulty of tampering with the contents of an earlier block. Thus, even though the contents of a blockchain may be available for all to see, they become practically immutable.

The provided blockchains and/or Proof schemes may be used to help create consensus among many distributed and potentially untrusted parties. According to the provided blockchain protocol, a miner may mine a block based on the quality of wireless network coverage they provide, and to the extent to which such quality is proven (e.g., via the Proof-of-Coverage scheme described in further detail elsewhere herein). That is, a block may be mined by a provider without having to solve complicated puzzles (i.e., hashes), which allows substantially improved efficiency in the mining process. For instance, a block can be mined every 0.1-20 minutes, for example from 0.1 to 0.2, from 0.2 to 0.4, from 0.4 to 0.6, from 0.6 to 0.8, from 0.8 to 1, from 1 to 2, from 2 to 4, from 4 to 6, from 6 to 8, or from 8 to 10, from 10 to 12, from 12 to 14, from 14 to 16, from 16 to 18, or from 18 to 20 minutes. In some cases, each block can be mined every 1 minute or less. Alternatively, a block can be mined at longer than 20 minute intervals.

Blockchains as provided herein may be used to prove that nodes in the network exist in the physical geography or space that they claim, provide a cost-effective way to run application logic core to the operation of a DLPWAN, and/or also furnish a machine-to-machine micro-transaction system.

The systems and methods may register device (e.g., one or more devices 150) hardware public keys to the blockchain, and establish a root of trust for devices on the network. The systems and methods may facilitate device provisioning and addressing by application logic built into the blockchain. In some cases, the systems and methods may store the devices' Internet routing information (e.g., Transmission Control Protocol/Internet Protocol—TCP/IP) in the blockchain. In some cases, the systems and methods may facilitate the transactions between devices and providers securely and/or honestly without human intervention. The systems and methods can minimize transaction costs and/or clearing times.

Figure 2:
FIG. 2 shows an exemplary block structure at an epoch, in accordance with embodiments of the invention.

A blockchain may comprise one or more blocks. A block may contain a header and a list of transactions. In some embodiments, a block may further comprise information related to time of the block being created/verified and link to a previous block. FIG. 2 shows an exemplary block structure 200 at an epoch, in accordance with embodiments of the invention. As shown in FIG. 2, a block 200 in a given epoch in the blockchain may comprise, for example, a block version, block height, previous block hash, Merkle hash transactions (e.g., transactions 1 . . . n), threshold signature by a current consensus group, or any combination thereof. A block may comprise a cryptographic timestamp), Proof-of-Work hash and signatures, and the like. In some cases, the blockchain may comprise a summary of all the transactions in the block.

Various different transactions can be included in a block. For example, the transactions may be a coinbase transaction such as a transaction for mining rewards. The transactions may relate to various actions or events such as creation of state channel for micro-transactions, exchange of tokens between entities, providers and/or participants joining the network, providers and/or participants changing their location and various other transactions. In some cases, the coinbase transaction can be the first transaction in a block.

The blockchain may comprise a hash of previous blocks in the chain, a set of transactions, and/or one or more Proof scheme. For example, the first transaction can be a coinbase transaction, which can be a miner claiming a reward based on the mining reward scheme. Once there are a significant number of participants and transactions on the network, the mining reward may be expired and miners may earn tokens as a result of transaction fees between participants and providers.

Provided herein is a Decentralized Low Power Wide Area Network (DLPWAN) implementing a blockchain network. DLPWANs may be configured to provide a bridge between low power non-TCP/IP devices and the TCP/IP based Internet by way of multiple independent providers, and can also outline a protocol specification by which devices using such a network should conform. Routing and coordination, for instance in DLPWAN, is decentralized and does not require any trusted parties.

Figure 1B:
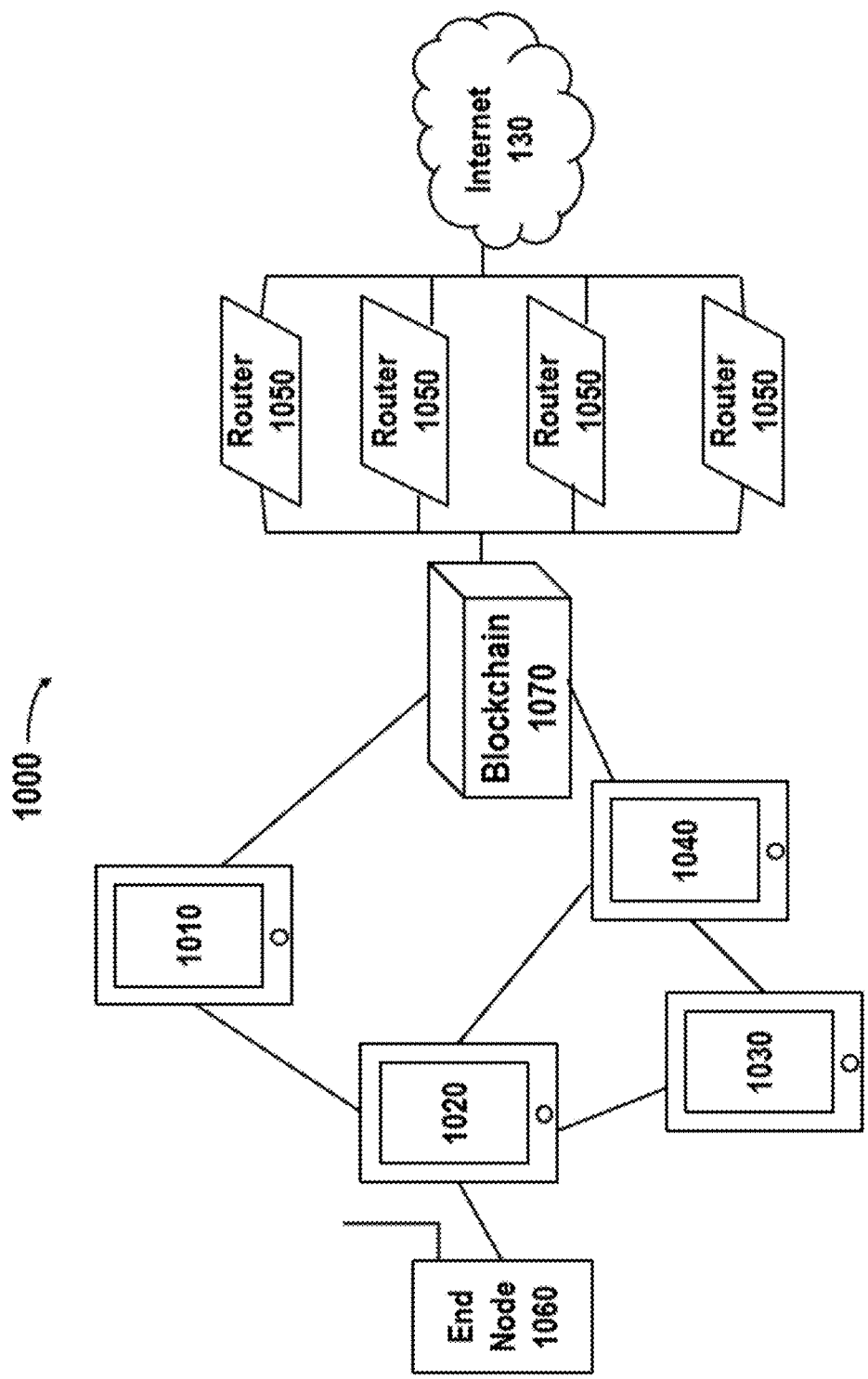
FIG. 1B shows an exemplary topology of the network, in accordance with embodiments of the invention.

FIG. 1B shows an exemplary topology of the network 1000, in accordance with embodiments of the invention. In some cases, provider-hosted gateways 1010, 1020, 1030, 1040 in the network may connect to a router 1020 application on the TCP/IP Internet 130 (from FIG. 1A) and/or create wide-area RF coverage which end nodes 1060 can use as a bridge to the Internet. The wide-area RF coverage and/or data transmission provided by the provider-hosted gateways may be managed by a decentralized blockchain consensus system as described above. In some embodiments, the provider-hosted gateways may be operated by the providers or nodes as described in FIG. 1A and the end node may operate as one or more devices as described in FIG. 1A. In some cases, the provider-hosted gateways may be the same as the providers or nodes as described in FIG. 1A.

The network 1000 may be substantively stationary or dynamic. For example, the nodes or providers (i.e., the provider-hosted gateways 1010, 1020, 1030, 1040) may be movable. A geographical location of the nodes may change over time. The network may have any topology. The network topology may or may not be dynamic. In some cases, the network may have a star-of-stars topology such that multiple providers may be connected to a router application and each of the multiple providers may be capable of providing wide-area RF coverage to multiple end nodes as shown in FIG. 1B. In some cases, the network may not be a mesh network. For instance, an end node may use a single hop to reach a gateway. For example, as illustrated in FIG. 1B, the end node 1060 of a participant 150 may use a single hop to reach a gateway 1020. Then the gateway 1020 can reach the Internet via other gateways 1010, 1020, 1030, 1040 and a router 1050. The gateway may be selected based on multiple factors such as the geolocation of the gateway and price offered for coverage or data delivery. The selected gateway may be a gateway validated using the provided method and system as described above. Alternatively, the network may be a mesh network that a node may use multiple hops to reach a gateway. It is not intended that the invention be limited by the specific examples provided within the specification. For example, multiple end nodes may be connected to a single provider-hosted gateway, a single provider-hosted gateway may provide network coverage to multiple end nodes concurrently or sequentially, or multiple gateways may collectively provide coverage to the end nodes in a concerted manner.

The DLPWAN may implement an adjustable network scheme which allows routers 1050 to coordinate with gateways 1010, 1020, 1030, 1040 and ultimately end nodes 1060 to adjust modulations and/or data rates depending on a variety of network conditions and factors. For example, if a given end node 1060 is in close proximity to a gateway 1020, it may use a higher bandwidth and/or data rate to transmit and receive in order to optimize for transfer speed and battery life.

Traffic on the DLPWAN may be encrypted. For example, Galois/Counter Mode (GCM), such as AES-GCM, can be used for the encryption on the DLPWAN. End nodes 1060 can require authentication to the network. For example, end nodes 1060 can be authenticated the network via an elliptic Curve Diffie-Hellman key exchange (ECDH). In some cases, the security of the wireless network is stronger than a typical LPWAN implementation because all end nodes 1060 in the network are required to have a hardware key-storage device. Additionally, the strong authentication scheme can allow for secure two-way communication which can be used to control equipment and devices.

Also disclosed herein are routers 1050, which can be internet-deployed applications that can receive packets from end nodes 1060 (e.g., via gateways 1010, 1020, 1030, 1040) and route them to appropriate Internet destinations 130, such as an HTTP or MQTT endpoint.

The routers can perform one or more of the following functions: 1) authenticating end nodes 1060 with the DLP-WAN; 2) receiving packets from gateways 1010, 1020, 1030, 1040 and routing them to the Internet 130; 3) delivering downlink messages, such as OTA updates, to end nodes 1060 via gateways 1010, 1020, 1030, 1040; 4) adjusting RF conditions on end nodes 1060 such as data rate, transmit power, and modulation; and 5) providing authentication and/or routing mechanisms into third party cloud services.

When a gateway 1010, 1020, 1030, 1040 receives a data packet from an end node 1060 on the network, it can perform a lookup to determine which router 1050 to use, for instance, based on the network address of the end node 1060. Routers 1050 can be hosted by anyone on the network and/or can define end nodes traffic to be delivered there by any gateway 1010, 1020, 1030, 1040 on the network. This can allow participants 150 to create VPN-like functionality whereby encrypted data is delivered only to one or more routers 1050 that they specify, and can optionally host themselves.

Network and RF information, such as Signal to Noise Ratio (SNR) and Received Signal Strength Indication (RSSI), can be periodically delivered from gateways 1010, 1020, 1030, 1040 to the appropriate routers 1050. Routers 1050 can make use of this data to advise end nodes 1060 on RF settings, such as data rate and power amplification level, to be optimal given the physical location of an end node 1060. This can allow for a high capacity network that can continuously improve and/or heal itself.

Routers 1050 may implement a system for providing a secured connection. In some examples, the system may be a channel, which can handle the authentication and/or routing of data to a specific third party Internet application, such as Microsoft's Azure IoT Hub (azure.microsoft.com/en-us/services/iot-hub/). These channel implementations can take advantage of the onboard hardware security of an end node 1060 to create a secure, hardware-authenticated connection to a third party, which can be difficult to implement directly on an embedded microcontroller. In some cases, a channel, which can be used to build additional interfaces to Internet services, can be implemented using open source software.

In some cases, the router 1050 may be a cloud router, which can be for anyone to use. In some cases, the router 1050 can be an open-source router that is available as source code and/or a binary package for a variety of operating systems and distributions, such as Microsoft Windows, mac OS, iOS, Chrome OS, BlackBerry Tablet OS, Unix, and Linux.

The DLPWAN may utilize any suitable wireless network communication technologies, such as, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, multi-carrier modulation (MDM), discrete multi-tone (DMT), Bluetooth®, ZigBee™, or the like.

In some embodiments, the DLPWAN may be implemented on various hardware, such as commodity sub-1 GHz radio hardware. For example, the DLPWAN can be implemented on a ISM (industrial, scientific and medical) frequency band, such as the 900 MHz band, 33-centimeter band, 2.4 GHz ISM band, 5 GHz band, or 60 GHz band. The DLPWAN may communicate using unencumbered modulations, such as (G)FSK and PSK in a narrow band (6.25-250 kHz). The DLPWAN may be compatible and/or interoperable with multiple radios. The modulation format can be simple, widely supported, easy to modulate and demodulate, or may have resistance to RF noise. The DLPWAN may employ suitable mechanism to detect a transmission error. A transmission error may include random bit errors, long burst errors, packet loss, excessive delays that may be caused by possibly link downs or network congestion. Transmission error may be detected based on the specific transmission protocol, channel coding methods or various other factors. For example, transmission error may be detected by checking the redundancy bits compressed with the source bits (e.g., Forward Error Correction). An exemplary wireless protocol is described later herein. Forward Error Correction (FEC) can be implemented at the firmware level in order to maintain hardware compatibility among multiple vendors. The wireless networks may support any suitable communication technologies such as Bluetooth or Wi-Fi. The DLPWAN can be used in conjunction with one or more types of wireless or wired communication signals and/or systems.

Gateways 1010, 1020, 1030, 1040 can be physical network devices. For example, gateways 1010, 1020, 1030, 1040 can create wireless RF coverage over wide areas, and/or act as mining nodes for the blockchain 1070. The gateways 1010, 1020, 1030, 1040 can transmit data back and forth between routers 1050 on the Internet 130 and end nodes 1060 on the network, process blockchain contracts and micro-transactions, and/or provide validation and verification systems for the blockchain 1070 mining process.

The wireless connection may be a direct wireless connection, such as Bluetooth® (e.g., a wireless technology standard for exchanging data over short distances using short-wavelength UHF radio waves in the ISM band from 2.4 to 2.485 GHz), infrared, ZigBee™, near field communication, ultraband, WiFi (e.g., a technology for wireless local area networking with devices based on the IEEE 802.11 standards), or optical communications. The wireless connection may be a short-range wireless communications may be provided (e.g., on the order of reaching at least a few centimeters, tens of centimeters, meters, or tens of meters). The wireless connection may be an indirect wireless connection, such as 3G, 4G, LTE, GSM, or WiMax. The wireless connection may traverse a telecommunications network. The wireless communication may permit long-range wireless communications and/or may not be dependent on relative locations between the user device and the card reader. The wireless communication may traverse one or more intermediary devices or relay stations. The gateways 1010, 1020, 1030, 1040 may be configured to permit direct communications, indirect communications, or both. The gateways may be capable of switching between different communication types.

In some cases, the gateways 1010, 1020, 1030, 1040 can create long distance coverage, for example, at least about 50 meters, 75 meters, 100 meters, 125 meters, 150 meters, 175 meters, 200 meters, 225 meters, 250 meters, 275 meters, 300 meters, 350 meters, 400 meters, 450 meters, 500 meters, 350 meters, 600 meters, 450 meters, 700 meters, 750 meters, 1000 meters, 1050 meters, 900 meters, 950 meters, 1 kilometers, 2 kilometers, 3 kilometers, 4 kilometers, 5 kilometers, 6 kilometers, 7 kilometers, 8 kilometers, 9 kilometers, or 10 kilometers. Gateways can be a cost effective way to create wide area network coverage for compatible devices.

Gateways 1010, 1020, 1030, 1040 may connect to the Internet 130 using any TCP/IP capable backhaul, such as Ethernet, WiFi or cellular. The gateways may contain a radio frontend capable of listening to several MHz of RF wireless spectrum at a time, and/or can be able to hear all network traffic transmitted within that spectrum. In some cases, the gateways may use synchronized frequency hopping schemes.

The gateways 1010, 1020, 1030, 1040 may be located at or a component of any other device or system. The device or system may or may not be movable. In some cases, the gateway may be a component of a portable device or a movable object such that a geo-location of the gateway may be dynamic. The gateways can require a GPS or GNSS transceiver to obtain accurate position and/or date/time information. This satellite-derived location can be used in conjunction with a variety of other techniques to verify that a gateway is in fact providing wireless network coverage in the location it claims, and/or to mine tokens for that service.

Satellite location information can also be correlated with packet arrival events to provide Time Differential of Arrival (TDoA) location for end nodes 1060 if multiple gateways 1010, 1020, 1030, 1040 observe the same packet. This can allow end nodes 1060 to physically locate themselves without requiring a GPS/GNSS transceiver. It can also provide accurate location data at a fraction of the battery life and cost of competing methods.

An end node 1060 can be any wireless device capable of communicating with gateways 1010, 1020, 1030, 1040 on the network. The end nodes may or may not be low power devices. In some cases, end nodes 1060 may be low power devices with low data rate, such as sensors, actuators, Bluetooth devices, infrared devices, WiFi devices, optical devices, meters, on-street lighting control, precision agriculture controller and the like. Alternatively, the end node 1060 can be any device that may not be low power device that is able to establish a connection to a gateway to further connect to a wide area network. In some cases, end nodes 1060 can be battery-powered sensors. In some cases, end nodes 1060 can be devices that can live for several years using standard batteries. In some cases, end nodes 1060 can also be mains-powered. End Nodes 1060 can exist in a variety of forms, depending on the product or use case, and a variety of transmission and reception strategies can be employed to optimize for transmission/reception frequency or battery life.

The DLPWAN can be designed such that end nodes 1060 can be manufactured using commodity hardware available from a wide variety of vendors, and/or for a low cost Bill Of Materials (BOM). The technology in modern radio transceiver integrated circuits (ICs), such as the Texas Instruments CC1125 or STMicroelectronics S2-LP, combined with modern Forward Error Correction (FEC) techniques can enable long-range network systems that can be built without the need for proprietary modulation schemes or physical layers. In some cases, the end node 1060 may use the Microchip ECC508A (www.microchip.com/wwwproducts/en/ATECC508A) or equivalent hardware-based key storage device, which can be able to securely generate, store, and authenticate public/private NIST P-256 ECC key pairs without leaking the private key to anyone. In addition, a wide array of defense mechanisms can prevent logical attacks on the encrypted data between the key storage device and its host end node 1060, along with physical protections on the security device itself. The participant 150 can program their key storage device as part of the onboarding process defined in the wireless specification.

The wireless protocol disclosed herein can efficiently transmit data over wide areas and/or minimize power usage. In some cases, end nodes using the wireless protocol can last years in the field powered only by batteries. For example, the end nodes can last at least 1, at least 2, at least 3, at least 4, at least 5, at least 6, at least 7, at least 8, at least 9, or at least 10 years in the field powered only by batteries.

In some cases, the end nodes may use Frequency Shift Keying (FSK) and/or Gaussian Frequency Shift Keying (GFSK) in the industrial, scientific, and medical radio band (ISM bands) to communicate with gateways. For example, the ISM band can be an unlicensed band. In some cases, Forward Error Correction (FEC) schemes can be used by the wireless specification. In some cases, the radio transceivers used herein can be STMicroelectronics S2-LP, Texas Instruments CC1125, or NXP OL2385AHN.

The wireless communication between end nodes and gateways can take place in an unlicensed spectrum (e.g., ISM band). In some cases, the wireless communication can take place in the sub-GHz portion of the unlicensed spectrum.

The data rate of the network may range from 0.1 kilobit per second (kbps) to 500 kbps, for example, from 0.1 kbps to 1.0 kbps, from 0.1 kbps to 10 kbps, from 0.1 kbps to 100 kbps, from 0.1 kbps to 250 kbps, from 0.1 kbps to 500 kbps, from 0.3 kbps to 1.0 kbps, from 0.3 kbps to 10 kbps, from 0.3 kbps to 100 kbps, from 0.1 kbps to 250 kbps, from 0.3 kbps to 500 kbps, from 1.0 kbps to 10 kbps, from 1.0 kbps to 100 kbps, from 1.0 kbps to 250 kbps, from 1.0 kbps to 500 kbps, from 10 kbps to 100 kbps, from 10 kbps to 250 kbps, from 10 kbps to 500 kbps, from 100 kbps to 250 kbps, from 100 kbps to 500 kbps, or from 250 kbps to 500 kbps. In one example, the data rate of the network can range from 0.3 kbps to 250 kbps.

The bandwidth of the network may range from 0.1 kilohertz (kHz) to 500 kHz, for example, for example, from 0.1 kHz to 1.0 kHz, from 0.1 kHz to 10 kHz, from 0.1 kHz to 100 kHz, from 0.1 kHz to 250 kHz, from 0.1 kHz to 500 kHz, from 0.3 kHz to 1.0 kHz, from 0.3 kHz to 10 kHz, from 0.3 kHz to 100 kHz, from 0.1 kHz to 250 kHz, from 0.3 kHz to 500 kHz, from 1.0 kHz to 10 kHz, from 1.0 kHz to 100 kHz, from 1.0 kHz to 250 kHz, from 1.0 kHz to 500 kHz, from 10 kHz to 100 kHz, from 10 kHz to 250 kHz, from 10 kHz to 500 kHz, from 100 kHz to 250 kHz, from 100 kHz to 500 kHz, or from 250 kHz to 500 kHz. In one example, the data rate of the network can range from 6.25 kHz to 250 kHz. The network can use at least 1 channel, for example, at least 10, at least 50, at least 100, at least 200, at least 300, at least 400, or at least 500 channels. The network can use Frequency Hopping Spread Spectrum (FHSS).

The network (e.g., end nodes and gateway commutations) may use a blend of data rates and/or frequency channels. The data rates and/or frequency channels can be chosen dynamically. In some cases, the devices can trade off communication range for message duration (and vice versa) when transmitting data.

In some cases, end nodes may transmit on any channel, at any time, using any available data rate, for example, provided that they select channels in a random fashion for each new transmission and adhere to all region-specific duty cycle and transmit duration regulations. In some cases, communication between end nodes and cloud-based applications can be bi-directional. For example, the cloud-based applications can receive data and issue downlink commands. The network can tune device-level data rates and/or modulation characteristics. The network can transmit output.

The system disclosed herein can provide a cost effective way for end nodes to transmit and receive data, geolocate themselves in physical space, and/or provide a mechanism for sensor data to be bought and sold. The cost for these services can be cheaper than any existing alternative available today due to the inexpensive and distributed nature of creating network coverage.

A currency (e.g., token) can be distributed and used along with blockchain to facilitate the transactions. A participant end node can pay a provider gateway, via the currency, to transmit data, receive data, and/or geolocate itself. The provider and the participant can negotiate the price of this exchange via an automated bidding process. Participants can have the ability to accept payments for sensor data being transmitted from their devices. In some cases, an entity may be willing to pay for the sensor data, such as environmental or traffic data.

In some embodiments, the provided system may employ state channels. In some cases, some of the transactions may be off-blockchain transactions. State channels may be off-chain and private, known only to its participants, which means they allow for instant and anonymous transactions within them. State channels may have a limited lifespan which is predetermined based on time or amount of transactions carried out. Participants may also close their channel by providing the last updated state of transactions to the blockchain. In an example, state-altering operations, which are normally performed on a blockchain, may be conducted off of the blockchain in state channels, such as the payment channels in Bitcoin. For example, payment channels in Bitcoin can have instant fee-less payments to be sent directly between two parties. Moving these interactions off of the blockchain without requiring any additional trust can lead to significant improvements in cost and speed.

The network may support traditional on-chain transactions and/or transactions on state channels. The state channels can be a multi-party payment network that is similar to the Bitcoin Lightning Network (Joseph Poon, Thaddeus Dryja, The Bitcoin Lightning Network, lightning.network). In some cases, IoT payment schemes can require many small payments that are not practical in traditional on-chain transactions.

Proof-of-Coverage

Under a "Proof-of-Coverage" scheme, miners may be required to submit proofs at regular intervals. All miners may have a score which decays over time, and that can be boosted by submitting Proofs-of-Coverage to the blockchain. At a fixed epoch, a consensus group of the highest scoring miners may be elected. For that epoch, all transactions can be encrypted and submitted to the consensus group for inclusion in the blockchain. The consensus group can then be responsible for decrypting transactions using the threshold decryption, agreeing on the validity and ordering of transactions, forming them into blocks, and appending them to the blockchain for which the members of the consensus group can receive a reward. Block formation protocols are described in further detail below.

Beneficially, because the consensus group validates transactions without having to provide an associated complex block-proof, beyond a threshold signature, there is essentially no settlement time, and the transaction throughput can be extremely high compared to other blockchains, such as a Nakamoto Consensus blockchain (e.g., Bitcoin, Ehtereum).

Under the blockchain protocol of the distributed network 110, miners (e.g., providers 140) may compete to mine a new block. Miners may be required to prove wireless network coverage that the one or more devices 150 can use to communicate with the WAN (e.g., Internet). Such proofs made using the Proof-of-Coverage and Proof-of-Serialization protocols described herein may be audited and verified by other miners. A "Proof-of-Serialization" can be a cryptographic anchor that roots the miners' "Proof-of-Coverage" with a cryptographic time proof. With the two Proofs combined, an approximate location and time of events occurring within the network 110 can be determined.

Beneficially, the Proof schemes implemented in the present disclosure may have utility-based value to the network. For example, most existing blockchain networks such as Blockchain and Ethereum use a Proof-of-Work system that relies on an algorithmic puzzle that is asymmetric in nature. These proofs are extremely difficult to generate, but simple for a third party to verify. Security on these networks is essentially achieved by the network-wide consensus that the amount of computing power required to generate a valid proof-of-work is difficult to forge, and as subsequent blocks are added, the cumulative difficulty of the chain becomes prohibitively difficult to fabricate. These computation-heavy proofs are, however, not otherwise "useful" to the network beyond securing the blockchain. While there have been attempts in other networks to turn mining power into something useful, such as Ethereum executing small programs called smart contracts, the majority of the work is not useful or reusable. The mining process can also be extremely wasteful, as the determining factor in the work is typically computational power which consumes massive amounts of electricity and requires significant hardware to execute.

The proofs of the present disclosure may be resistant to Sybil Attacks in which dishonest miners create pseudonymous identities and use them to subvert the network and gain access to block rewards to which they should not be entitled. This is a particularly difficult attack vector to manage in a physical network such as the one in the present disclosure. The proofs may also be resistant to a new attack vector: Alternate Reality Attacks, where a dishonest group of miners are able to simulate that wireless network coverage exists in the physical world when it in fact does not. An example of this would be running the mining software on a single computer and simulating GPS coordinates and RF networking.

In the Proof-of-Coverage (PoC) proof, a miner proves that they are providing wireless network coverage, W, in a specific region to a challenger, C. PoC can be an interactive protocol where a set of targets, $T_n$, assert that W exists in a specific GPS location, L, and then convinces C that $T_n$ are in fact creating using the wireless RF network. Beneficially, and unconventionally, PoC attempts to prove the veracity of miners in a physical space, and uses it to achieve consensus on a blockchain network. The PoC can be used to (1) prove that the miners are operating RF hardware and firmware compatible with the wireless protocol, (2) prove that miners are located in the geography they claim by having them communicate via RF, and (3) correctly identify which version of reality is correct when there is a conflict.

PoC is an improvement over the Guided Tour Protocol (GTP), which devises a system for denial of service by requiring a client c to make a request to a variety of tour guide computers, $G_n$, in order to gain access to a server, s. The tour guides must be visited in a specific order and a hash of data exchanged to reveal the location of the next $G_n$ in order. Only after every $G_n$ has been visited can c gain access to s. Once c gets to the last stop of the tour, it submits evidence of the first and last stop to s who is able to verify that the first and last stops of the tour are correct without needing to contact $G_n$, and that c could only know the first and last stops if it had completed the tour correctly.

However, GTP is not suitable as a proof for networks, such as the RF wireless network of the present disclosure, where there is limited range, and therefore a node cannot communicate with peers anywhere on the network. The PoC and Proof-of-Serialization described herein allow miners on the network to achieve cryptographic time consensus among decentralized clients in a secure way without depending on any particular time server, and in such a way that, if a time server does misbehave, clients end up with cryptographic proof of that misbehavior.

The PoC protocol constructs a proof using the following characteristics of RF communication that are unique and different from Internet communication: (1) RF has limited physical propagation and therefore distance, (2) the strength of a received RF signal is inversely proportional to the square of the distance from the transmitter, and (3) RF travels at the speed of light with (effectively) no latency.

Figure 3:
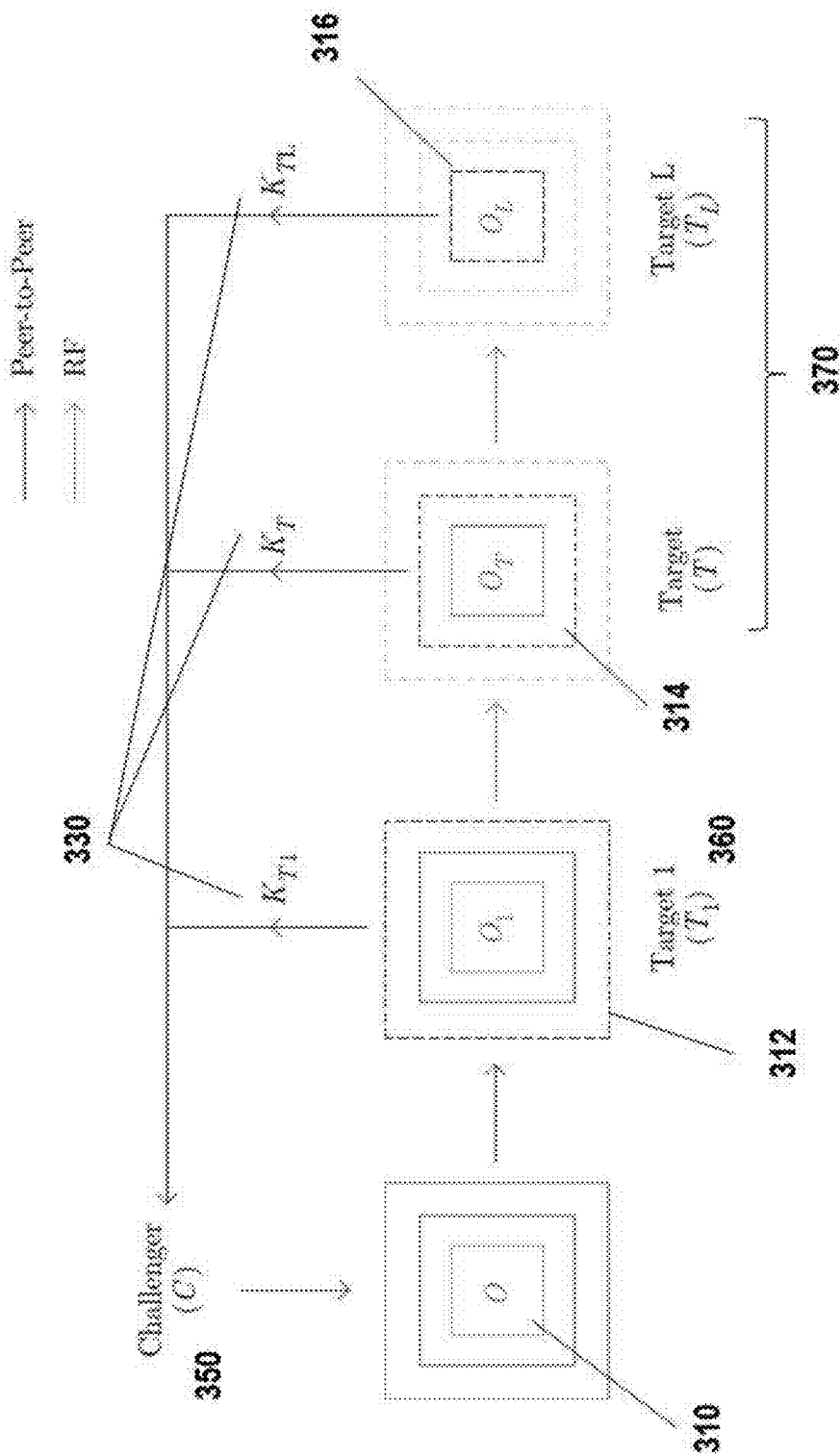
FIG. 3 illustrates a multi-layer data packet deconstruction.

FIG. 3 illustrates a multi-layer data packet deconstruction. A challenger, C (350), deterministically constructs a multi-layer data packet, O (310), which begins at an initial target, $T_1$ (360) and is broadcast wirelessly to a set of sequential, geographically proximate, targets, $T_n$ (370), each of which is only able to decrypt the outer-most layer of O if they were the intended recipient. Each target signs a receipt, $K_s$ (330), delivers it to C (350), removes their layer of O (310), and broadcasts it for the next target. In the illustrated example, the data packet, O (310) comprises at least three layers 312, 314, 316. The data packet is broadcast wirelessly to the initial target, $T_1$ (360) which removes first layer 312 and signs a receipt $K_{T1}$ which is delivered to C. Then the data packet is broadcast wirelessly to target, T, which removes second layer 314 and signs a receipt $K_T$ which is delivered to C. Then the data packet is broadcast wirelessly to the local target, $T_L$, which removes third layer 316 and signs a receipt $K_{TL}$ which is delivered to C. Essentially, only the intended recipient may decipher the envelope of envelopes. While this example has only three targets, it will be appreciated that there may any number of sequential, geographically proximate, targets, $T_n$.

A geographic reference target, T, can be located deterministically for the challenger, C. Both C and T are miners in the network. T does not need to be geographically proximate to C. To do so, C initially seeds verifiable entropy, η, into the selection process by signing the current block hash with C's private key. Since the probabilities associated to each miner form a discrete probability distribution, C can use the probability associated with each eligible miner to locate T and apply the inverse cumulative distribution function using a uniform random number generated via η. This allows the targeting of potentially dishonest miners as they have a lower score, thus increasing the probability of being targeted by C. Given that a miner's core diminishes linearly over time, the inverse relationship provide the low-scoring miners an opportunity to participate and increase their scores. Such process may also incentivize all participants to send receipts to the challenger and broadcast the remainder of O.

Figure 4:
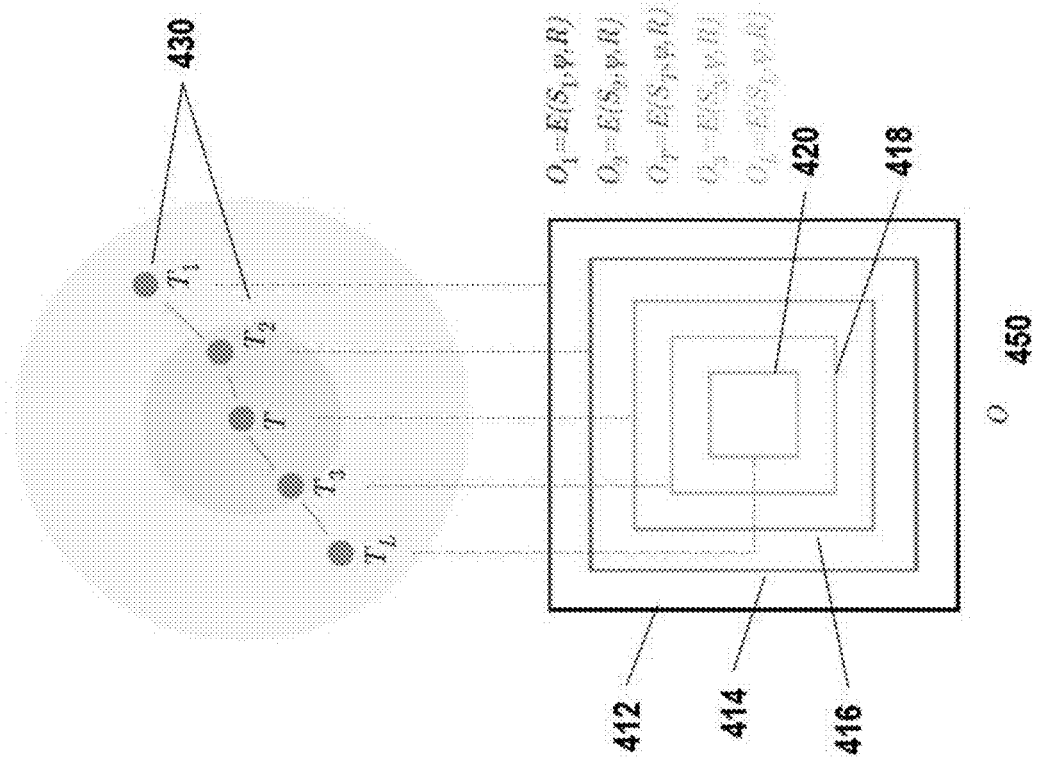
FIG. 4 illustrates a multi-layer data packet construction.

FIG. 4 illustrates a multi-layer data packet construction. A multi-layer data packet, O (450), comprises a plurality of layers 412-418 which are broadcasted over the wireless network and received by geographically proximate targets, $T_n$ (430). Geographically proximate may be defined as within a radius of a network value $T_{radius}$. Each layer of O, $O_l$, may comprise a three-tuple of E (S, ψ, R), where E is a secure encryption function (e.g., using the ECDH derived symmetric key), S is a nonce, ψ is the time to broadcast the next layer of the challenge and R is the remainder of O consisting of recursive three-tuples. The maximum number of $O_l$ may be bound by a network value, $O_{max}$. The construction logic of O by C can be as follows (also illustrated in FIG. 4):

1. A set of candidate nodes, $T_n$, are selected such that all members of $T_n$ are within a contiguous radio network that also contains T.

2. Two targets, $T_1$ and $T_L$, are selected by finding the highest scoring targets in $T_n$ furthest from T.

3. A weighted graph, $T_g$, is constructed from $T_n$ such that members of $T_g$ in radio range of each other are connected by an edge weighted by the value of: $1-((score(T_a)-score(T_b)))$.

4. The shortest path between $T_1$ to T to $T_L$ is computed using Dijkstra's algorithm using the edge weights from the previous step.

5. An ephemeral public/private key pair $E_k$ and $E_{k-1}$ are generated.

6. A layer $O_l$ is created and added to O, and S is encrypted with the combination of the public key of $T_L$, retrieved from the blockchain as $T_{Lk}$ and $E_{k-1}$ as an Elliptic-Curve Diffie-Hellman (ECDH) exchange to compute a shared secret, known only to both parties C and $T_L$.

7. The previous step repeats with additional layers added to O until all targets between $T_L$ and $T_1$ have a layer $O_t$ included in O.

Once O has been constructed, it is delivered to $T_1$ via the Internet peer-to-peer network and immediately broadcast by $T_1$ via the wireless network. Because the wireless protocol described herein is not a point-to-point system, several miners within the proximity of $T_1$ will hear O. However, via the three-tuple E (S, ψ, R) included in the specific layers of O, only the specific target T will be able to decrypt E and send a valid receipt back to the challenger, C.

Figure 5:
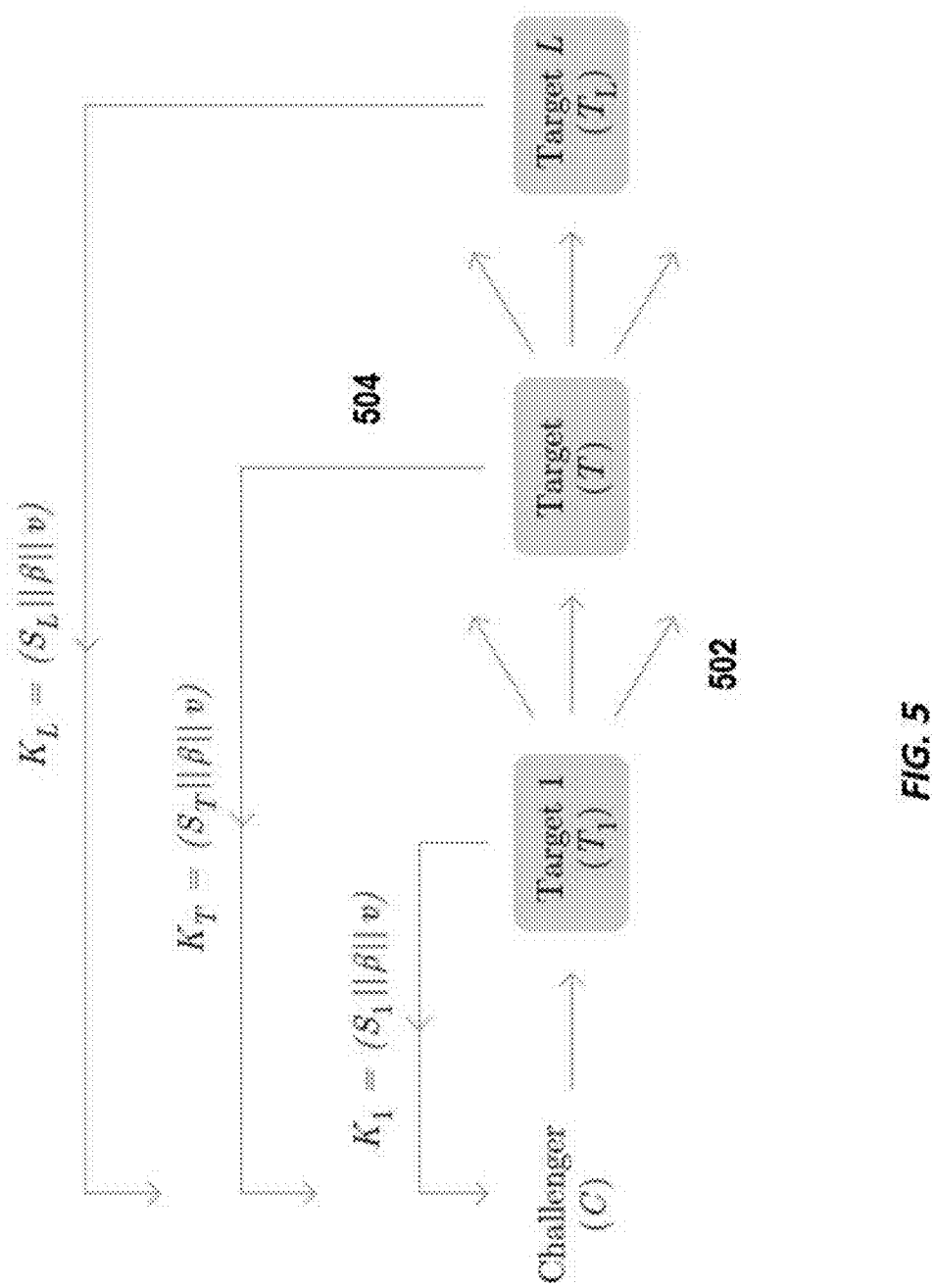
FIG. 5 illustrates a process flow for the proof-of-coverage scheme.

FIG. 5 illustrates a process flow for the proof-of-coverage scheme. The proof-of-coverage scheme may comprise a series of broadcasting 502 and receipt transmissions 504. In a first operation, $T_1$ can receive O from C via a peer-to-peer Internet network (or other WAN), decrypt the outermost layer of O and immediately broadcast R (three-tuple E's for remaining layers of O) via the wireless network. T can hear O and attempt to decrypt the value of E by using its private key, pk: $E_{pk}$ (S, ψ, R). T can then record both the time of arrival, β, and the signal strength, ν, of O. If successful, T can then create a signed receipt $K_s|K_s=(S||β||ν)$ signed by the private key (pk) of T. T may then submit $K_s$ to C via the peer-to-peer Internet network, remove the outermost layer of O, and wirelessly broadcast the remainder of O. These steps can be repeated for sequential targets, $T_1 \ldots T \ldots T_L$, with $T_L$ being the last target in the graph.

There may be any number of layers in the data packet O. For example, there may be at least 1, 2, 3, 4, 5, 6, 7, 8, 9, 10, 11, 12, 13, 14, 15, 16, 17, 18, 19, 20, 30, 40, 50, 60, 70, 80, 90, 100, 150, 200, 250, 300, 350, 400, 450, 500 or more layers in the data packet O. The number of target nodes that O is transmitted to may correspond or otherwise correlate to the number of layers in the data packet O.

C expects to hear responses from $T_g$ (weighted graph) within a time threshold, λ. Unless C has heard responses from $T_g$ within the time threshold, λ, C may consider the Proof-of-Coverage to have concluded. Because C is the only party with complete knowledge of O, upper bounds of the values for time of arrival, β, and the signal strength, ν, may be assigned by C, which are used to verify that each layer of O was transmitted approximately where and when it was expected. The upper bound for time of arrival, β, may be limited by the speed of light, r, between $T_n$ and $T_{n-1}$. That is, subject to some slight delays from reflection or multipath, the packet should not arrive at $T_g$ later than r multiplied by the geographical distance D plus some epsilon value, $ν=rX(D+ε)$. For ν, because of the inverse-square law, the maximum RSSI (Received Signal Strength Indication) possible for a packet transmitted, μ, from $T_g-1$ to $T_g$ as $μ=1/D^2$. Gateways that are closer than expected, or which are transmitting at a higher power to mask their location disparity, are unlikely to produce the correct μ value, given that they would not know where the next layer of O is addressed to. Once $T_L$ has delivered receipt to C, or λ has elapsed, the proof-of-coverage process can complete. The collection of signed receipts, $K_s$, can make up the proof-of-coverage package that C can submit to the network.

Scoring

Each miner may be allocated a score, $φ_m$, upon joining the blockchain network. This score may be compared to a predetermined threshold score for honesty. For example, miners with scores equating or greater than the predetermined threshold score for honesty may be categorized as honest miners. A miner's score may depreciate according to the height of the miner's last successful verification, and number of verifications. As $φ_m$ decreases, the probability of the miner M being the target for C can increase such that the network can continually attempt to prove that the low scoring miners are acting honestly, and provide miners with a reasonable opportunity to improve the low scores. The following invariants are provided: M, miner; ν, difference between number of successful verifications for M and number of failed verifications for $M(N_{sucess}-N_{falure})$; and h, height since the last successful verification for M. In an example, if the ideal verification interval for any miner is close to 240 blocks (e.g., 4 hours if 60 second block time), the invariants can be scaled to fit the scoring functions:

v', v/10.0
h', h/480

Figure 6A:
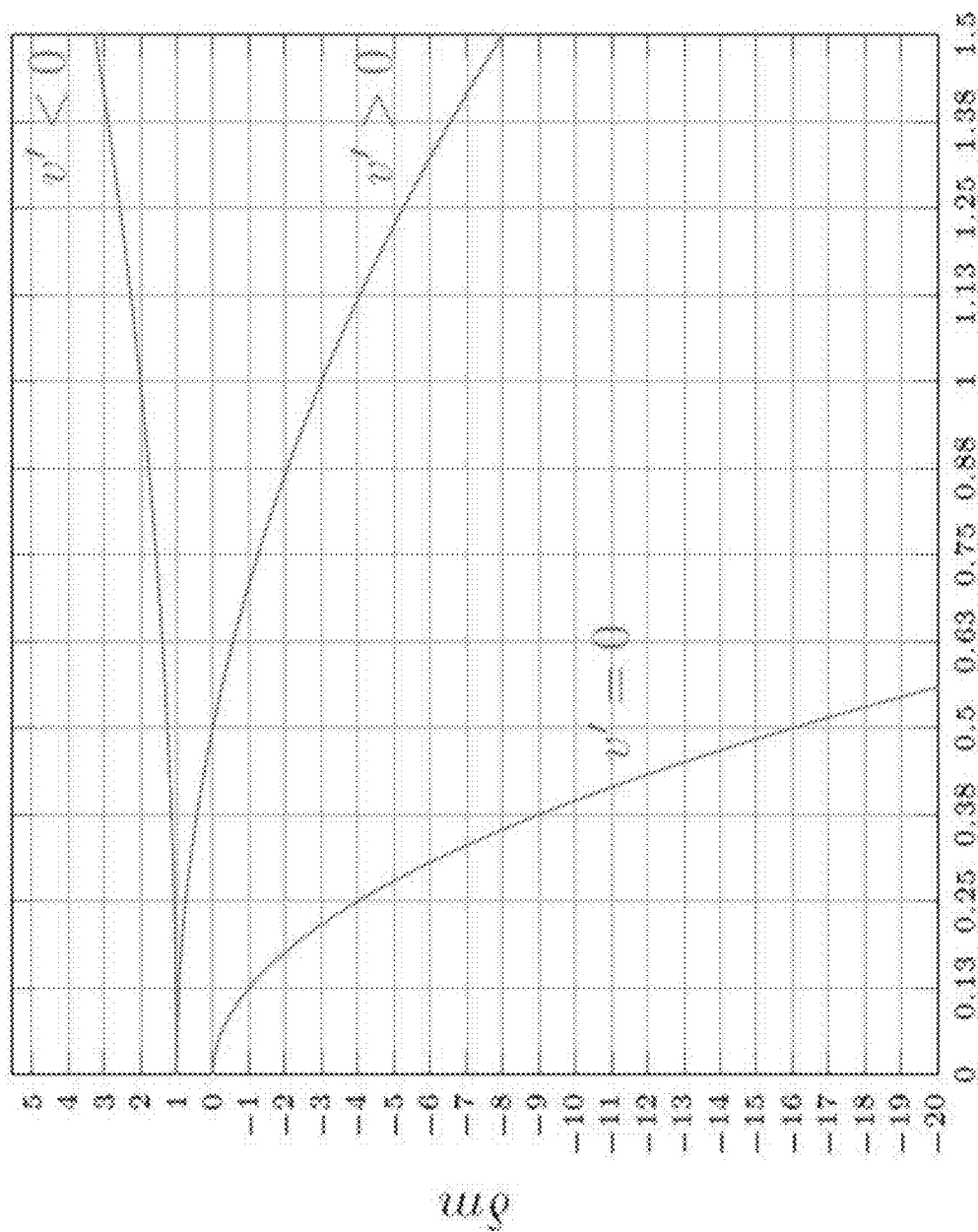
FIG. 6A illustrates the trends of the staleness-factor, $\delta_m$, as a function of scaled height, h.

Then, a staleness-factor, δ, may be used to determine the score of the miner M:

$$δm = \begin{cases} -(8 \cdot h')^2 & v' = 0 \\ v' \cdot \left(1 - \dfrac{h'^2}{\min(0.25 \cdot v')}\right) & v' > 0 \\ v' \cdot (1 - 10 \cdot v' h'^2) & v' < 0 \end{cases}$$

such that (1) if v'=0, there is no trust information, and therefore, a steep parabolic curve is used for the dependent, dependent on h'; (2) a positive v' implies that the miner is consistently successfully verifying, and an inverse parabolic curve that crosses the Y axis at 1 is used, where the width of the parabola increases as a factor of v up to 0.25 (i.e., implying that the more positive verifications the miner accrues, the slower its score decays as a factor of h'); and (3) a negative v' indicates that the miner is consistently failing verification, and the width of the parabola decreases as a factor of v, leading to a higher score decay for the miner as a factor of h'. FIG. 6A illustrates the trends of the staleness-factor, $δ_m$, as a function of scaled height, h, for the above three trends, when v'<0, v'>0, and v'=0.

The following scoring function for score, $φ_m$ is provided, which may be a variation of a sigmoid curve fluctuating between values (0,1):

$$φ_m = \frac{\arctan(2 \cdot δm) + 1.58}{3.16}$$

Figure 6B:
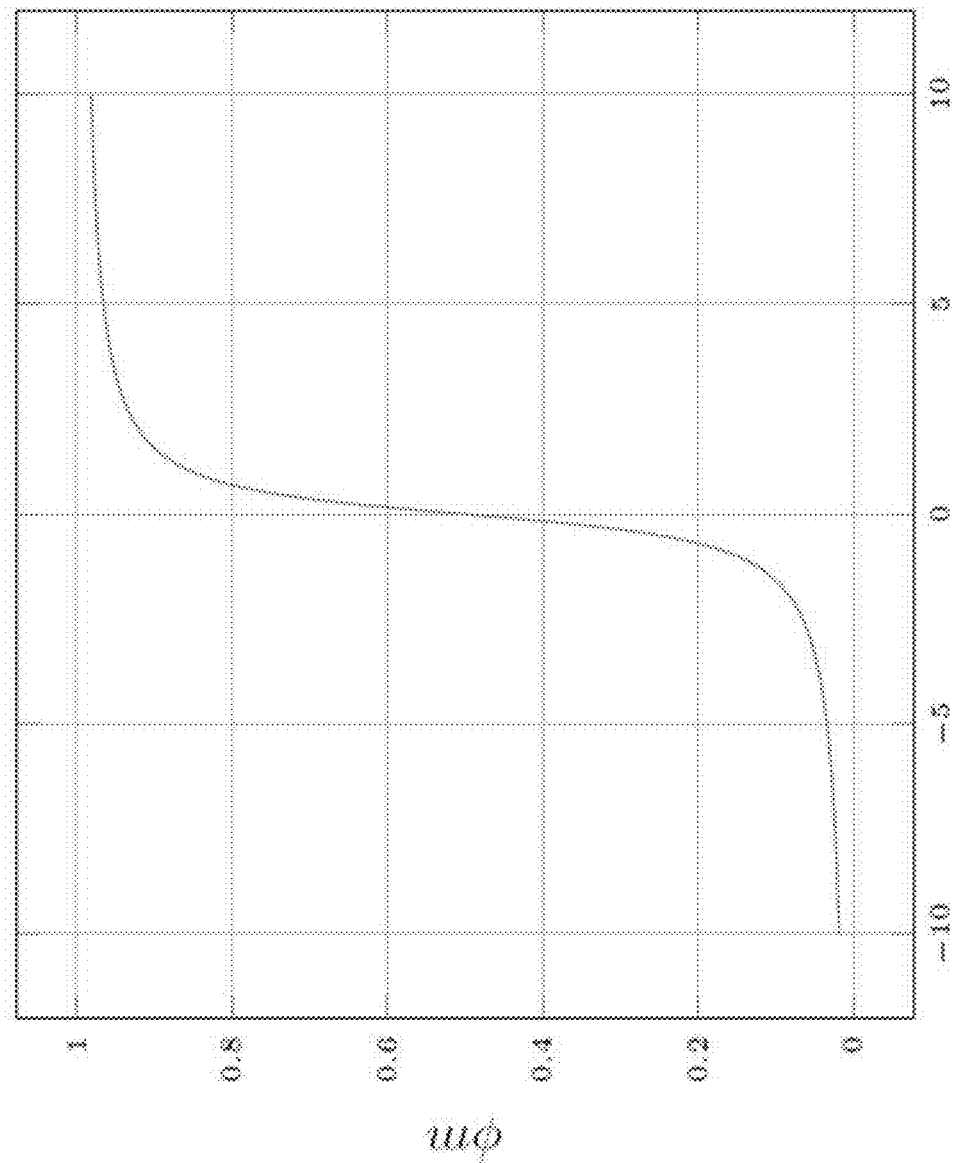
FIG. 6B illustrates the variation of the score as a function of the staleness-factor.

FIG. 6B illustrates the variation of the score as a function of the staleness-factor.

Figure 6C:
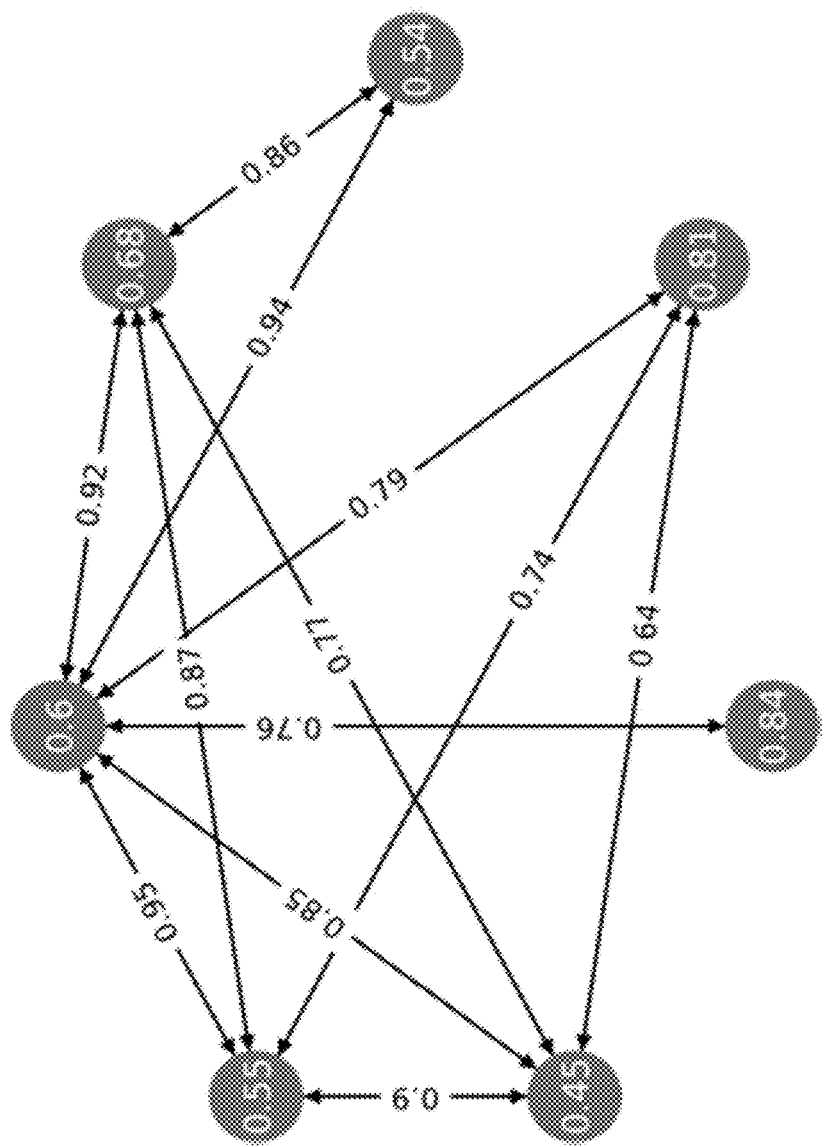
FIG. 6C shows an example of a random subset of the network at any blockchain height h.
Figure 6D:
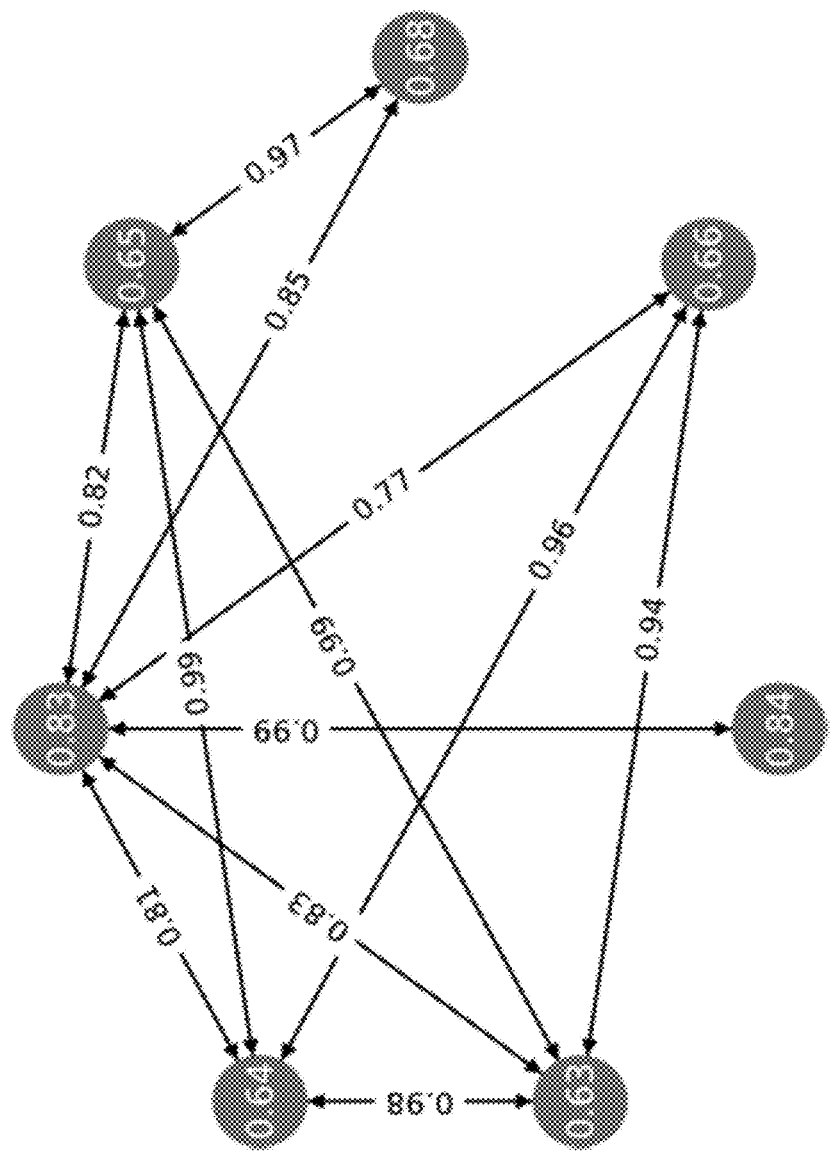
FIG. 6D shows an example of the network of FIG. 6C after 10,000 iterations.

FIG. 6C shows an example of a random subset of the network at any blockchain height h. Each node represents a miner at a random location, with an associated score. The edges may be calculated using Dijkstra's algorithm (see E. W. Dijkstra, *A note on two problems in connection with graphs*, 1954, which is entirely incorporated herein by reference). FIG. 6D shows an example of the network of FIG. 6C after 10,000 iterations.

Beneficially, such scoring algorithms, by using the calculated edge-weights (via Dijkstra's algorithm) and the target selection mechanism (described in further detail below), may boost the score of a miner when it is being verified by other high scoring miners, such as to favor legitimate miners and deter dishonest miners.

Due to the scoring decays designed in the PoC scheme, there may be a possibility that a given miner's score becomes stale if the miner is not verified within a reasonable interval. A target selection mechanism may statistically increase such miners' opportunities to increase their score. The target selection mechanism may comprise biasing the probability that a miner is selected as a potential target based on the individual score of the miner. The target selection probability to each miner can be defined by:

$$P(m) = \frac{1 - \phi_m}{n - \sum_{i=1}^{n} \phi_m},$$ (Equation (1))

where the set of miners is defined as:

$$N = \{m_1, m_2, m_3, \ldots m_n | n > 1\}$$

and the set of scores is defined as:

$$S = \{\phi_m, m \in N\}.$$

That is, Equation (1) may ensure that the miner with the lowest score is assigned the highest probability of being selected as a potential target, and the miner with the highest score is assigned the lowest probability of being selected as a potential target. The probabilities are inversely proportional to the score of an individual miner, allowing successful targeting of potentially low scoring miners and improving the overall balance of the scoring system. Further, all of the probabilities may together form a discrete probability distribution which satisfies the following equation:

$$\sum_i P(M = i) = 1$$

Verifying the Proof

Once the PoC is completed (e.g., T has delivered the signed receipt $K_s$, or λ has elapsed), the challenger C can submit the proof, via a special type of transaction. All receipts $K_s$ received from $T_1 \ldots T_L$ are included in the transaction published to the blockchain network. All of the operations completed by C are verifiable and recreatable randomness, such as by verifying miner, V. Verifying miners in the consensus group who are able to see the proof transaction may verify the PoC by recreating the following steps: (1) V reconstructs the set of miners N; (2) random seed (e.g., verifiable entropy), η, is verified by V to have been created at approximately the correct time by the private key of C; (3) V selects T from N, as seeding with η will result in the same target selection; (4) reconstruct the set of candidates $T_n$ from which $T_1$ and $T_L$ are determined; (5) use Dijkstra's algorithm to reconstruct the graph $T_g$; and (6) verify that the $K_s$ receipts have been signed by the private keys of $T_1 \ldots T \ldots T_L$. Once this is completed, the score of C can be adjusted appropriately.

Proof-of-Serialization

Figure 7A:
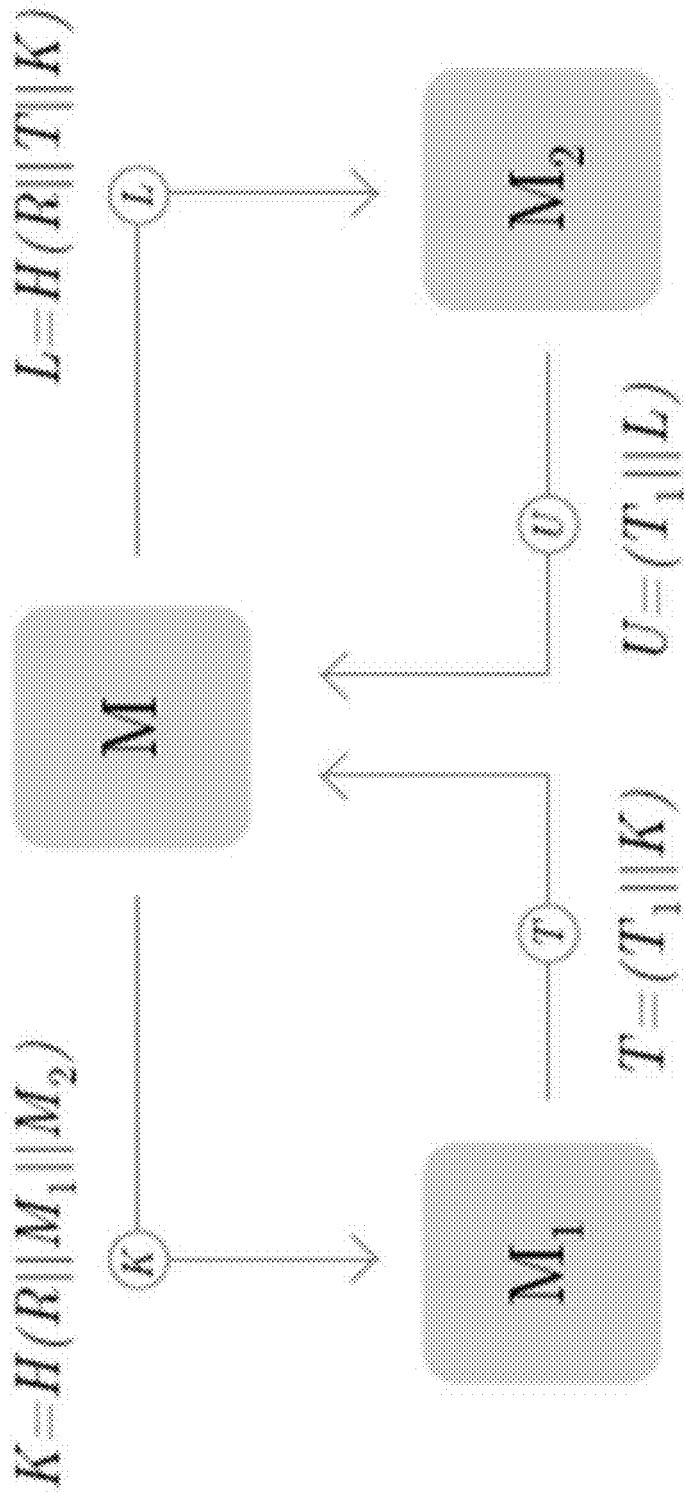
FIG. 7A illustrates a process flow for constructing a proof-of-serialization.

Cryptographic time consensus among decentralized clients may be achieved via Proof-of-Serialization. FIG. 7A illustrates a process flow for constructing a proof-of-serialization. The process is described as follows: (1) A miner M pseudo-randomly picks two miners $M_1$ and $M_2$ to prove contact serialization. (2) It is assumed M has a public key for $M_1$ and $M_2$, or M may obtain it from the blockchain. (3) M generates a nonce, R, which can be a SHA312 hash of the PoC which M has partially constructed. (4) M generates a salted hash commitment K, herein referred to as the 'proof-kernel': $K = H(R\|M_1\|M_2)$. (5) M sends K to $M_1$, and $M_1$ replies with T, a signed message including the current time $T_1$ and K. (6) M knows that the reply from $M_1$ was not pre-generated because it includes the nonce R that M generated. (7) Because M cannot trust $M_1$, it may ask another time from $M_2$. For the second request, a new nonce, R, is generated using T truncated to 312-bits, blinded by XOR'ing a randomly generated 312-bit number. (8) M then generates a sub-proof-kernel, $L = H(R\|T_1\|K)$, and sends it to $M_2$. (9) $M_2$ replies with U, a signed message including the current time $T_2$ and L. (10) U is now a proof artifact that shows that M desired and then proved a serialization between $M_1$ and $M_2$.

While the above example illustrates verification with only two servers ($M_1$ and $M_2$), such that even though M may end up with proof that something is wrong it cannot identify which of two is wrong, it will be appreciated that M may verify with any number of servers to generate a chain of proof (e.g., identifying the outlier) of any server's misbehavior, signed by several others, and enough accurate replies to establish what the correct time, $T_t$, is. For example, a miner may construct a proof-of-serialization with at least about 2, 3, 4, 5, 6, 7, 8, 9, 10, 20, 30, 40, 50, 60, 70, 80, 90, 100, 200 or more servers.

In an example of verification of the proof-of-serialization, if the times from $M_1$ and $M_2$ are significantly different, and the time from $M_2$ is before M, then M has proof of misbehavior. The reply from $M_2$ may implicitly show that it was created later because of the way that M constructed the nonce. If the time from $M_2$ is after, then M can reverse the roles of $M_1$ and $M_2$ between the two servers, repeat the process, and obtain a misordered proof as in the other case.

Figure 7B:
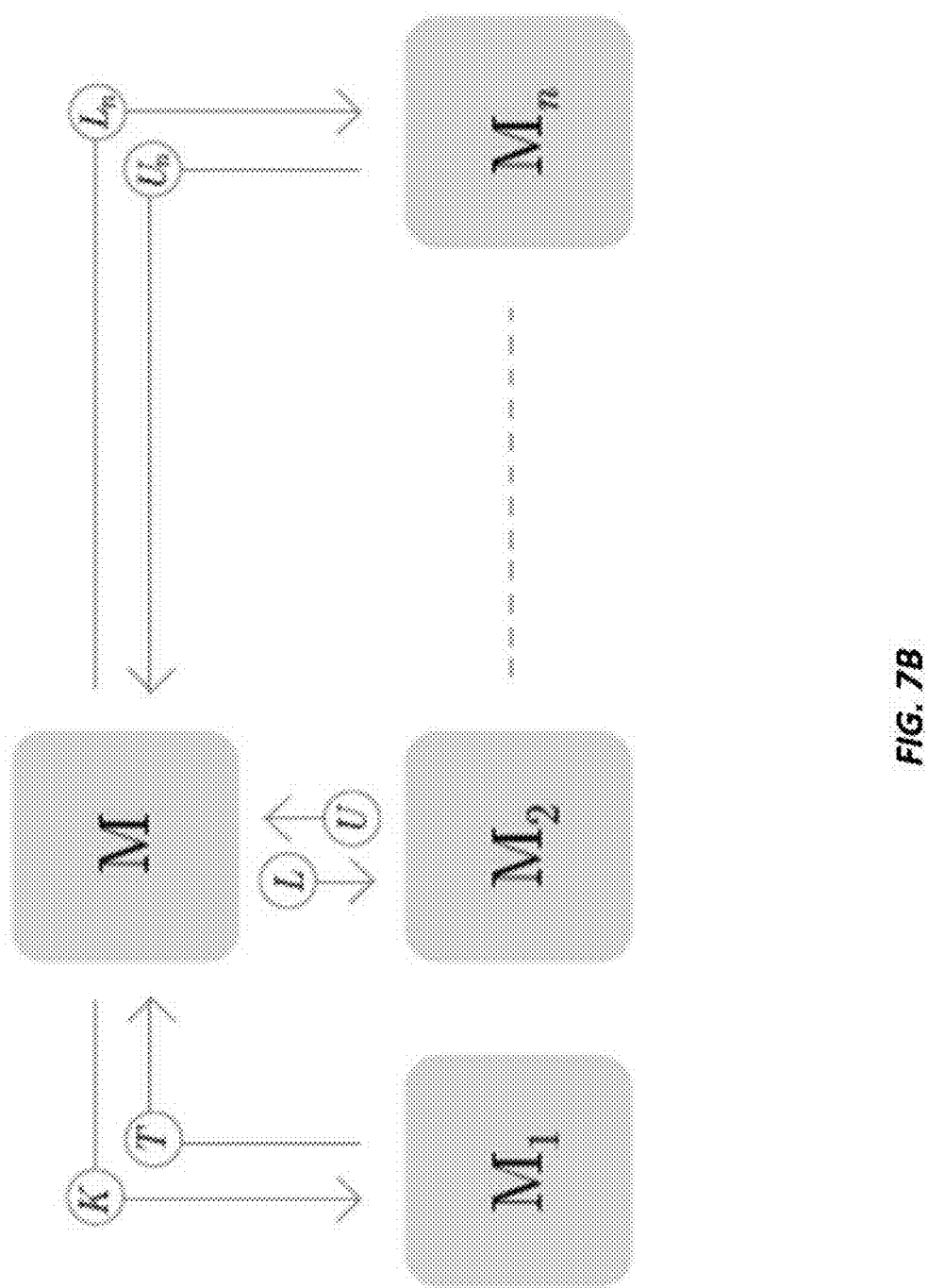
FIG. 7B illustrates a process flow for verifying a proof-of-serialization.

FIG. 7B illustrates a process flow for verifying a proof-of-serialization. To verify the correct time, M may repeat the time synchronization process with enough miners to gain consensus on the correct time. The process is described as follows: (1) A miner M pseudo-randomly selects n number of miners $M_1 \ldots M$. (2) M generates a salted hash commitment K, and delivers it to $M_1$, where K $H(R\|M_1\|M_2)$. (3) $M_1$ replies with T, a signed message including the current time $T_1$ and K. (4) M then generates a sub-proof-kernel, $L = H(R\|T_1\|K)$, and sends it to the next miner $M_k$. (5) $M_k$ replies with U, a signed message including the current time $T_k$ and L. (6) These steps are repeated through $M_n$ until at least three responses, $T_k$, are monotonic. $T_n$ can then be confirmed to be $T_t$, the correct time.

Once the correct time, $T_t$, has been determined, it can be used by M and included during proof construction. For example, the randomness η used to compute O and thus obtain the PoC can be tied to the previous block, which contains $T_r$. This allows proving, with relative certainty, that some piece of data D was created between the time of the previous block and $T_r$. D may be the proof of poverage, which must have been constructed between the time of the previous block and $T_r$. Beneficially, this ensures that the proof of coverage cannot be pre-computed or otherwise pre-forged.

Provided also are proof-of-location protocols that may proof the geolocation of the target using various methods. Proof-of-time can be used in conjunction with proof-of-location methods. For example, the proof-of-location methods may include random number broadcast, spectral scan comparison, global positioning system (GPS) location, TCP/IP Proof-of-Connectivity, Network latency analysis, or any combinations thereof. These proof-of-location methods can be anchored using Proof-of-Time, for example, where one or more of these methods are signed by a cryptographically proven timestamp. This can add another layer of verification to the proving methods, as accurately falsifying a combination of these techniques as well as a cryptographic timestamp is unlikely. Detailed methods for implementing proof-of-location protocols are described in U.S. provisional application No. 62/613,364, filed Jan. 3, 2018, which application is entirely incorporated herein by reference.

Token Staking

In some cases, gateways on the network may stake a bond in order to participate in the mining process. In some cases, an amount of bond may be required in order to be eligible to participate in the mining process. In some cases, the amount of the bond required for participating in a mining process may be determined based on the geographic location and/or density of gateways within a region of the gateway. For instance, the amount of the bond may be a function of the geographic location and the density of other gateways within a distance from the gateway. For example, in regions with a high number of existing gateways, the amount of bound may be significantly higher. In another example, when a gateway changes location, the amount of bound required to maintain eligibility may change accordingly before that gateway is able to participate in the mining process. Gateways near the ideal network density (near the center) may be cheaper to add, but establishing a new network or overpopulating an already crowded network may get expensive very quickly. In an example, the token staking fee and network density may be related by the following equation: $y=(x-D)^4+F$, where y defines fees, x defines network density, D defines ideal gateway density, and F is the unit fee for a location transaction.

In some cases, if a gateway's quality score falls below a certain threshold, the bond may be revoked, and the provider 140 may be required to stake a new bond if they wish for that gateway to participate in the mining process. In some cases, the new bond can be a higher amount than the previously revoked bond, for example, at least about 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 100%, 150%, 200%, 250%, 300%, 350%, 400%, 450%, or 500% higher than the previously revoked bond.

One purpose of the system can be to prevent gateways from acting dishonestly by making it expensive to attempt to manipulate the network for profit. In some cases, if a dishonest actor intentionally locate itself in close physical proximity with others (such as in a warehouse), attempt to manipulate the mining process by way of collusion (such as a Sybil attack), or misrepresent elements of the Proof-of-Reality, the dishonest actor may carry a high risk and/or potential cost under this system. For example, the attacker in a Sybil attack can subvert the system of a network by creating a large number of pseudonymous identities, using them to gain a disproportionately large influence. However, the system described herein can prevent the Sybil attack by making it more expensive.

Permissionless Network Consensus Protocols

Figure 8:
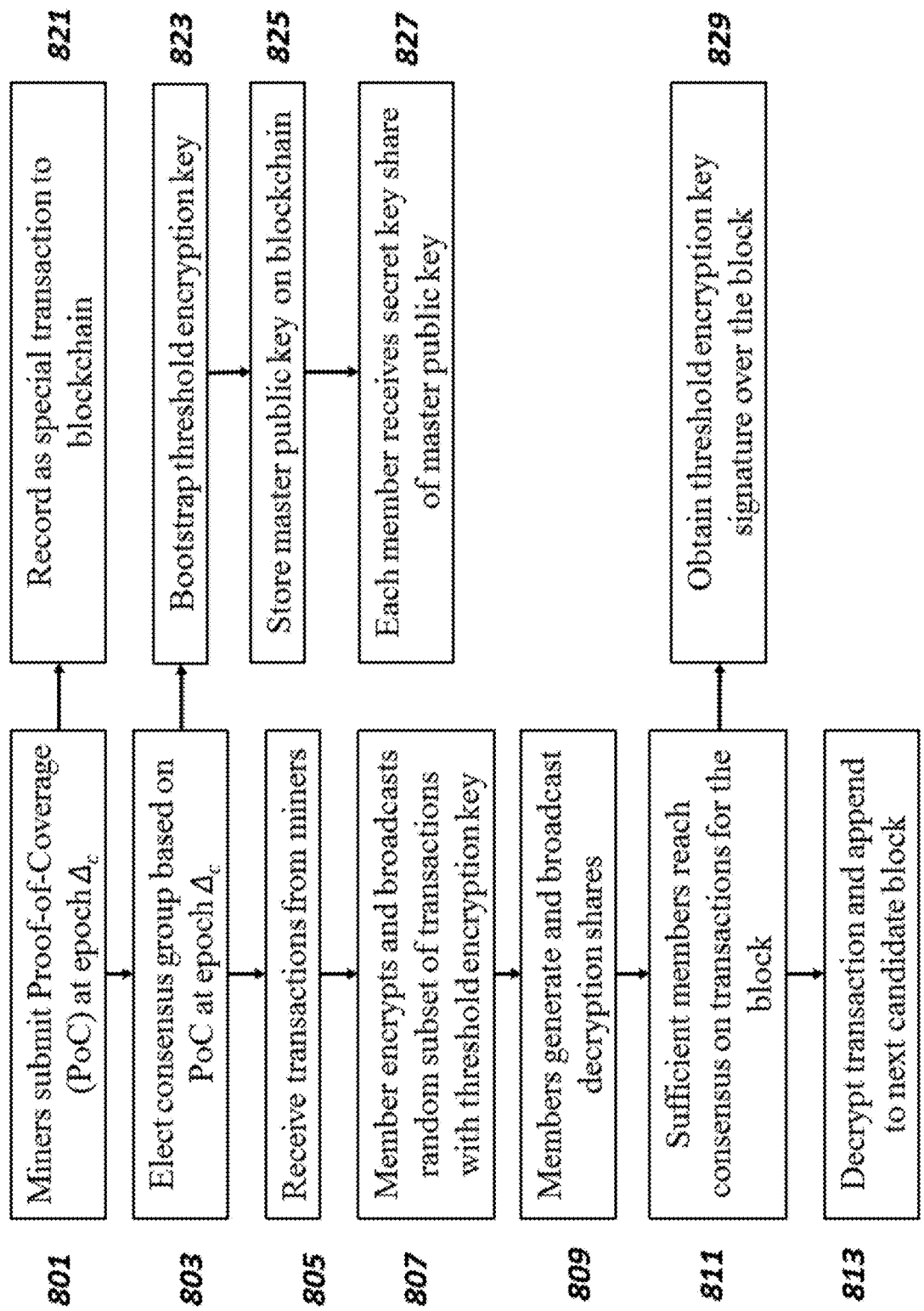
FIG. 8 illustrates a process flow for a permissionless network consensus protocol.

Provided are permissionless network consensus protocols that implement the Proof-of-Coverage schemes described herein. In some instances, the consensus protocols described herein may be applied to, and/or applied as variants to, existing protocols, such as the HoneyBadgerBFT (HBFT) asynchronous *byzantine* fault tolerant protocol. FIG. 8 illustrates a process flow for a permissionless network consensus protocol.

The protocol may be implemented amongst a network of nodes, in a consensus group, C. Miners in the protocols described herein may submit Proofs-of-Coverage to the network at an epoch, $\Delta_p$ (801). The Proofs may be submitted as a special type of transaction, and subsequently recorded to the blockchain (821). The miners may increase their respective scores by submitting valid proofs to the network, as described elsewhere herein. At epoch $\Delta_c$, the highest scoring miners, N, may be elected as the new consensus group, C (803). Alternatively, the consensus group may be elected based on other standards that use the Proofs-of-Coverage. Because the Proof-of-Coverage are used to elect the members of the consensus group, C, the identities of the nodes may each be distinct and well-known. The consensus group may receive transactions as input (805), achieve consensus as to an ordering of the transactions, and record the transactions into one or more blocks to be added to the blockchain. The protocol may proceed in a series of cycles, wherein a new group of transactions is appended to the blockchain at the end of each cycle. At the beginning of a cycle, the consensus group may select a subset of the received transactions as a buffer group, and provide the buffer group as input to a randomized agreement protocol. At the end of the agreement protocol, the final set of transactions for the particular cycle may be selected. Each consensus group (e.g., at each epoch) may be involved in a single cycle. Alternatively, each consensus group may be involved in multiple cycles. In some instances, each consensus group may be involved on the order of at least 1, 10, 100, 1000, 10,000, or more cycles.

During the epoch $\Delta_c$, the currently elected consensus group, C, may be responsible for creating blocks and appending the blocks to the blockchain. The new transactions may be submitted to the current members of the consensus group (805). In some instances, new blocks may be created by the consensus group at a fixed interval (e.g., $\Delta_b$) and recorded to the blockchain. Upon creation of the block, a token block reward may be divided among the members of C for every block submitted to the blockchain. In some instances, the sum of all fees contained, or associated, with the valid transactions may also be divided among the members of C. In some instances, where there are no transactions received during a particular interval, an empty block may be appended to the blockchain.

The transactions may be encrypted such that no individual node is able to decrypt or censor a particular transaction without colluding with at least a majority of the consensus group. For example, the transactions may be encrypted using a sharded public key. Once the consensus group C is elected for the epoch $\Delta_c$, a distributed key generation phase can occur to bootstrap a threshold encryption key (e.g., TPKE) (823), a cryptographic primitive that allows any party to encrypt a transaction to a master public key (e.g., PK) such that members of C have to work together for decryption. Once the master public key is generated, a block containing the master public key may be immediately submitted to the blockchain (825). Each member, $N_m$, in the consensus group may receive a secret key share (e.g., $SK_i$) of the master public key (827). A transaction may be recovered once f+1 correct members of C compute and reveal decryption shares, $\sigma_i$. Once the f+1 nodes have agreed on the transactions for the block, a threshold encryption key signature can be obtained over the block (829), certifying that a sufficient number of nodes have reached a consensus to exceed the *Byzantine* fault threshold. Members of the consensus group that are censoring or in disagreement over the contents of the block will produce an incompatible signature share that cannot be used to count towards the signature threshold. The block may then be gossiped out over the network to all miners and added to the blockchain.

Miners on the network may submit new transactions to the consensus group. Upon receipt, each member of the consensus group can take a random subset of the first B transactions in its queue and apply the threshold encryption key (807), and submit them to the other members of the consensus group. Once the members of the consensus group receive at least a certain number of encrypted transactions, they may run the decryption share function to produce and broadcast their decryption shares, $\sigma_i$ (809). Once f+1 members of C have seen $\sigma_i$ shares, the members may run the decryption function using the master public key, encrypted transactions, and the $\sigma_i$ shares, and attempt to decrypt the transaction (811). Each member of the consensus group can append decrypted transactions to their own instantiation of the next block in a local buffer (813). Double-spend and other malformed transactions may be removed from the blocks at this stage.

Beneficially, it is not possible for a transaction to be pre-censored by a given member prior to its inclusion in the candidate block, without the f+1 members of the consensus group colluding. As the members of C for any given epoch are selected based on the Proofs-of-Coverage, the member constitution of C is unpredictable, and such collusions are highly unlikely.

Computer Systems

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

The instructions, media for conveying such instructions, computing resources for executing them, and other structures for supporting such computing resources are means for providing the functions described in these disclosures.

Methods and systems according to the above-described examples can be implemented using hardware, software or a combination of both. For instance, the system may comprise one or more processors and at least one memory for storing program instructions. The processors can be part of a network interface system or a node device. Alternatively or additionally, the processors can be part of the host system of a node device. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the system can be implemented in hardware components (e.g., ASICs, special purpose computers, or general purpose computers), software or combinations of hardware and software.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for achieving consensus in a blockchain network, which blockchain network is configured to provide network coverage, the method comprising:
   (a) receiving proofs of network coverage from a plurality of nodes of the blockchain network, wherein the proofs of network coverage comprise verifications of one or more nodes in an expected geographical location and are providing expected wireless network coverage;
   (b) selecting a subset of the plurality of nodes based on the proofs of network coverage for validating a plurality of transactions related to providing the network coverage from the plurality of nodes; and
   (c) achieving a consensus within the subset of the plurality of nodes to at least a subset of the plurality of transactions and storing the subset of the plurality of transactions in a new block in the blockchain network.

2. The method of claim 1, wherein the verifications are created by validating the geographical location of the one or more nodes based at least in part on a strength of a radio frequency signal.

3. The method of claim 2, wherein validating the geographical location of the one or more nodes comprises determining the time of arrival of the radio frequency signal is within a time threshold and the strength meets a strength threshold.

4. The method of claim 1, wherein the subset of the plurality of nodes are selected based on a score as a function of previously created proofs of network coverage.

5. The method of claim 4, wherein the subset of the plurality of nodes are re-selected as the score is updated.

6. The method of claim 5, wherein achieving the consensus comprises decrypting the at least subset of the plurality of transactions by a pre-determined number of the subset of the plurality of nodes within a time window.

7. The method of claim 4, wherein the score is computed based on a number of successful verifications, a number of failed verifications, and a time since the last successful verification.

8. The method of claim 1, wherein the plurality of transactions are encrypted using a shared public key.

9. A system for achieving consensus in a decentralized blockchain consensus network, the system comprises:
- a plurality of nodes in the decentralized blockchain consensus network for providing network coverage, wherein a subset of the plurality of nodes are configured to:
  - (i) validate a plurality of transactions related to providing the network coverage from the plurality of nodes;
  - (ii) achieve a consensus within the subset of the plurality of nodes to at least a subset of the plurality of transactions; and
  - (iii) store the subset of the plurality of transactions in a new block in the blockchain network,
- wherein the subset of the plurality of nodes are selected from the plurality of nodes based on proofs of network coverage submitted by the subset of the plurality of nodes, wherein the proofs of network coverage comprise verifications of one or more nodes in an expected geographical location and are providing expected wireless network coverage.

10. The system of claim 9, wherein the verifications are created by validating the geographical location of the one or more nodes based at least in part on a strength of a radio frequency signal.

11. The system of claim 10, wherein validating the geographical location of the one or more nodes comprises determining the time of arrival of the radio frequency signal is within a time threshold and the strength meets a strength threshold.

12. The system of claim 9, wherein the subset of the plurality of nodes are selected based on a score as a function of previously created proofs of network coverage.

13. The system of claim 12, wherein the subset of the plurality of nodes are re-selected as the score is updated.

14. The system of claim 13, wherein the score is computed based on a number of successful verifications, a number of failed verifications, and a time since the last successful verification.

15. The system of claim 9, wherein the plurality of transactions are encrypted using a shared public key.

16. The system of claim 15, wherein the consensus is achieved by decrypting the at least subset of the plurality of transactions by a pre-determined number of the subset of the plurality of nodes within a time window.

\* \* \* \* \*